(12) United States Patent
Sala et al.

(10) Patent No.: US 7,127,167 B2
(45) Date of Patent: Oct. 24, 2006

(54) SYSTEM FOR SPECTRUM ALLOCATION IN ETHERNET-BASED FIBER OPTIC TDMA NETWORKS

(75) Inventors: Dolors Sala, Atlanta, GA (US); Ajay Chandra V. Gummalla, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/188,963

(22) Filed: Jul. 5, 2002

(65) Prior Publication Data

US 2003/0007212 A1  Jan. 9, 2003

Related U.S. Application Data

(60) Provisional application No. 60/302,674, filed on Jul. 5, 2001.

(51) Int. Cl.
*H04B 10/00* (2006.01)
(52) U.S. Cl. .......................................... 398/72; 398/69
(58) Field of Classification Search ................ 359/124, 359/125; 398/66–73
See application file for complete search history.

(56) References Cited

U.S. PATENT DOCUMENTS

| | | | |
|---|---|---|---|
| 4,726,010 A * | 2/1988 | Ali et al. ....................... | 398/75 |
| 4,763,317 A * | 8/1988 | Lehman et al. .............. | 370/358 |
| 5,202,780 A * | 4/1993 | Fussanger ..................... | 398/72 |
| 5,311,344 A * | 5/1994 | Bohn et al. ................... | 398/72 |
| 5,526,350 A | 6/1996 | Gittins et al. | |
| 5,574,584 A * | 11/1996 | Darcie et al. ............... | 359/125 |
| 5,583,561 A | 12/1996 | Baker et al. | |
| 5,793,506 A * | 8/1998 | Schmid ........................ | 359/125 |
| 5,933,192 A | 8/1999 | Crosby et al. | |
| 6,097,515 A | 8/2000 | Pomp et al. | |
| 6,895,185 B1 * | 5/2005 | Chung et al. ................. | 398/72 |

OTHER PUBLICATIONS

International Search Report for International Application No. PCT/US02/21044, International Filing Date: Jul. 5, 2002.

\* cited by examiner

*Primary Examiner*—Agustin Bello
(74) *Attorney, Agent, or Firm*—Sterne Kessler Goldstein & Fox PLLC

(57) ABSTRACT

A system for management of bandwidth, cost control, and operational efficiency in a fiber optic, ethernet-based, TDMA communications system. The invention features an aggregating optical node between a central office and end users. The optical spectrum is divided according to end user, direction (i.e., upstream or downstream), and/or according to function (e.g., video or non-video). In an embodiment of the invention, a wavelength coupler can be used to couple multiple upstream wavelengths from respective end-user devices, for forwarding to a central office. Moreover, adaptive equalization can be used for noise cancellation purposes.

4 Claims, 22 Drawing Sheets

SYSTEM FOR SPECTRUM ALLOCATION IN ETHERNET-BASED FIBER OPTIC TDMA NETWORKS

CROSS-REFERENCE TO RELATED APPLICATIONS

This application claims priority to U.S. Provisional Patent Application No. 60/302,674, filed Jul. 5, 2001, and incorporated herein by reference in its entirety.

The following United States and PCT utility patent applications have a common assignee and contain some common disclosure:

"System for Communications in Ethernet-Based Fiber Optic TDMA Networks," U.S. application Ser. No. 10/188,800, by Gummalla et al., filed concurrently herewith, incorporated herein by reference;

"System and Method for Bandwidth Management in Ethernet-Based Fiber Optic TDMA Networks," U.S. application Ser. No. 10/188,964, by Sala et al., filed concurrently herewith, incorporated herein by reference;

"System, Method, and Computer Program Product for Optimizing Video Service in Ethernet-Based Fiber Optic TDMA Networks," U.S. application Ser. No. 10/188,799, by Gummalla et al., filed concurrently herewith, incorporated herein by reference; and "System, Method, and Computer Program Product for Managing Communications in Ethernet-Based Fiber Optic TDMA Networks," PCT Application Ser. No. 60/302,674, by Gummalla et al., filed concurrently herewith, incorporated herein by reference.

BACKGROUND OF THE INVENTION

1. Field of the Invention

The invention described herein relates to data networks, and more particularly, to the use of ethernet over a fiber optic network.

2. Related Art

One of the current trends in data networking is the use of fiber optic media. Moreover, use of ethernet technology is a practical choice for such networks, given that ethernet is well understood and can be supported by available components. The application of ethernet fiber technology to relatively long distance access networks creates problems, however. Among the unresolved problems is how to share bandwidth efficiently and cost-effectively among multiple users in such an environment. A reasonable quality of service for all users is also desirable. Hence there is a need for a system, method, and computer program product by which bandwidth can be managed in an ethernet-based fiber access network, and service can be kept affordable and user-friendly to end users.

SUMMARY OF THE INVENTION

In this application, an invention is presented for management of bandwidth, cost control, and operational efficiency in a fiber optic, ethernet-based, TDMA communications system. The invention features an aggregating optical node between a central office and end users. The optical spectrum is divided according to end user, direction (i.e., upstream or downstream), and/or according to function (e.g., video or non-video). In an embodiment of the invention, a wavelength coupler can be used to couple multiple upstream wavelengths from respective end-user devices, for forwarding to a central office. Moreover, adaptive equalization can be used for noise cancellation purposes.

DETAILED DESCRIPTION OF THE INVENTION

Figure 1:
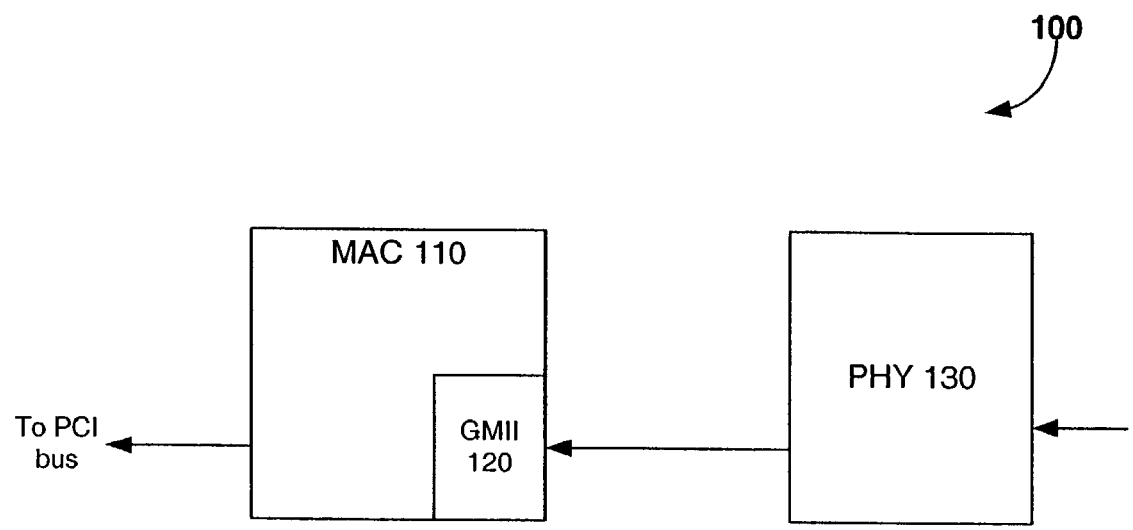
FIG. 1 is a block diagram illustrating a gigabit media-independent interface (GMII) incorporated into a media access controller (MAC).

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

In the invention described herein, the use of a time division multiple access (TDMA) architecture allows the sharing of bandwidth among multiple users. The Data Over Cable System Interface Specification (DOCSIS) describes a process through which bandwidth management and other requirements can be achieved in a TDMA setting. The present invention provides means for addressing management of bandwidth, cost control, quality of service, and operational efficiency in a fiber optic, ethernet-based, TDMA communications system.

In general, DOCSIS can be used in communication systems that include a set of remote communications devices connected to a headend device, such that the headend is responsible for the management of communications both to and from the remotes. The headend is responsible for the distribution of information content to the remotes (the so-called "downstream" direction); in addition, the headend is responsible for management of communications in the other direction, from the remotes to the headend (the "upstream" direction). Generally, in addition to sending content to remotes, the headend issues downstream map messages that instruct each remote as to when it can transmit upstream, and what kind of information it can send. In effect, the upstream bandwidth is controlled and allocated by the headend. Any given remote can transmit upstream only after requesting bandwidth and receiving a grant of the bandwidth from the headend. In a time division multiple access (TDMA) environment, bandwidth corresponds to one or more intervals of time. Moreover, the upstream can be organized into a number of channels, with several remotes assigned to each channel. This arrangement allows the headend to manage each upstream communications channel. In this manner, upstream communications are managed so as to maintain order and efficiency and, consequently, an adequate level of service.

In the realm of cable communications, DOCSIS specifies the requirements for interactions between a cable headend and associated remote cable modems. A cable headend is also known as a cable modem termination system (CMTS). DOCSIS consists of a group of specifications that cover operations support systems, management, and data interfaces, as well as network layer, data link layer, and physical layer transport. Note that DOCSIS does not specify an application layer. The DOCSIS specification includes extensive media access layer and physical (PHY) layer upstream parameter control for robustness and adaptability. DOCSIS also provides link layer security with authentication. This prevents theft of service and some assurance of traffic integrity.

The current version of DOCSIS (DOCSIS 1.1) uses a request/grant mechanism for allowing remote devices (such as cable modems) to access upstream bandwidth. DOCSIS 1.1 also allows the provision of different services to different parties who may be tied to a single modem. With respect to the processing of packets, DOCSIS 1.1 allows segmentation of large packets, which simplifies bandwidth allocation. DOCSIS 1.1 also allows for the combining of multiple small packets to increase throughput as necessary. Security features are present through the specification of 56-bit Data Encryption Standard (DES) encryption and decryption, to secure the privacy of a connection. DOCSIS 1.1 also provides for payload header suppression, whereby repetitive ethernet/IP header information can be suppressed for improved bandwidth utilization. DOCSIS 1.1 also supports dynamic channel change. Either or both of the downstream and upstream channels can be changed on the fly. This allows for load balancing of channels, which can improve robustness.

While the present invention is described herein in the context of DOCSIS, it should be understood that the systems and methods discussed below are also applicable in other contexts as well. Generally, these systems and methods are applicable to any fiber access system.

Note that in the discussion below, techniques are organized generally according to their benefit, i.e., cost control, bandwidth management, user-friendliness, and operational efficiency. This does not necessarily represent a limitation on the utility or scope of any of the techniques. A bandwidth management technique may, for example, have benefits with respect to a system's operational efficiency or user-friendliness. The categorization below should therefore not be viewed as any sort of limitation of applicability.

II. Cost Control

A. Hardware architecture

1. Detection of reference point at GMII

This aspect of the invention allows the use of existing, commercially available ethernet physical layer devices in a fiber optic TDMA network operating under DOCSIS. DOCSIS includes a process whereby a headend and associated remote devices become synchronized so that they all share the same sense of time with respect to upstream communications. This synchronization is known in DOCSIS as ranging. Ranging requires that remotes each send a burst of information at a time prescribed by the headend. The headend must then detect whether the burst arrived too soon or too late, relative to the prescribed arrival time. Typically, a specific reference point in the preamble of the burst is used to gauge the burst's arrival. When this point is detected, the burst is considered to have arrived. The start of frame delimiter (SFD) byte in a DOCSIS burst can be used for this purpose.

Commercially available ethernet physical layer devices, however, do not typically have the functionality that allows detection of a burst's reference point. In this invention, the reference point is observed not at the PHY device per se, but rather at the interface of the physical layer device to the media access controller. Because the delay through an ethernet physical layer device is nearly constant, however, it is not necessary for this device to detect the reference point.

In an embodiment of the invention, illustrated in FIG. 1, the detection takes place at a gigabit media-independent interface (GMII) 120 of the media access controller (MAC) 110. This can be implemented by hardware in MAC 110 that monitors incoming data from PHY device 130, to detect an SFD byte. The timing reference in the MAC 110 can be used to determine the time at which the SFD is observed, relative to the expected time of the SFD's arrival. The GMII and MAC may be placed at an optical node and/or at a headend device. Note that, in general, a GMII can be used to detect any field having a known relationship to the start of a frame, not just an SFD per se, for purposes of detecting a ranging offset.

2. Active PON

Another issue in the use of a fiber access network is the management and allocation of costs in topologies involving relatively long distances (e.g., 20 kilometers or more). One way to address this is to use an active architecture, instead of a passive optical network (PON) approach.

Traditionally, in a PON, transmission of information between a central office and end users, e.g., in their homes, is done through a passive splitter. While this is a workable architecture for relatively short distances, longer distances, up to 20 kilometers and beyond, are problematic. Longer distances require more powerful (and more expensive) light sources.

Figure 2:
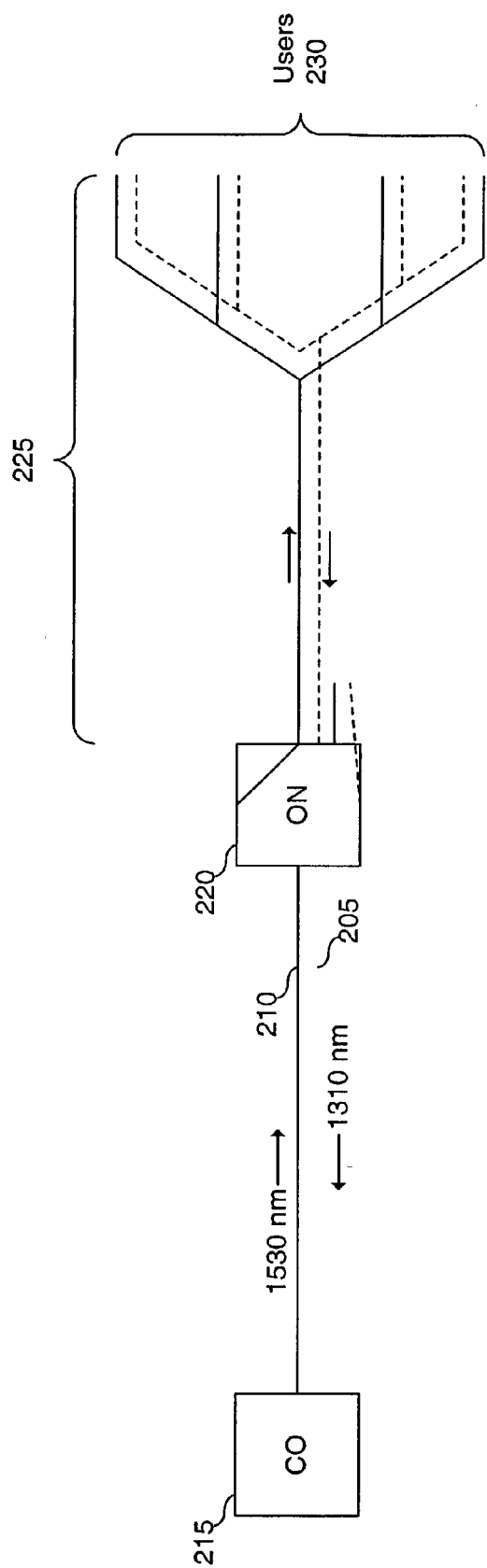
FIG. 2 illustrates a fiber optic network using an active passive optical network (PON) architecture.

Instead, an optical node acting as an aggregation device can be used to handle transmissions over longer distances. An embodiment of such a system is shown in FIG. 2. An upstream feeder channel 205 and a downstream channel 210 are shown, each operating on a different wavelength. The downstream feeder channel 210 connects a central office (CO) 215 and an optical node (ON) 220. ON 220 serves as an aggregation device. A distribution system 225 extends from ON 220 to users 230. Thus, a single expensive laser connects ON 220 and CO 215. Less powerful and, consequently, cheaper lasers in distribution system 225 connect end user devices 230 (e.g., modems) to ON 220.

The relatively high cost of the long distance laser can now be shared among users 230. The distribution path from ON 220 to users 230 is relatively cheap, since less power is required for shorter distances. The costs of using a remote device can therefore be lowered by this approach.

Figure 3:
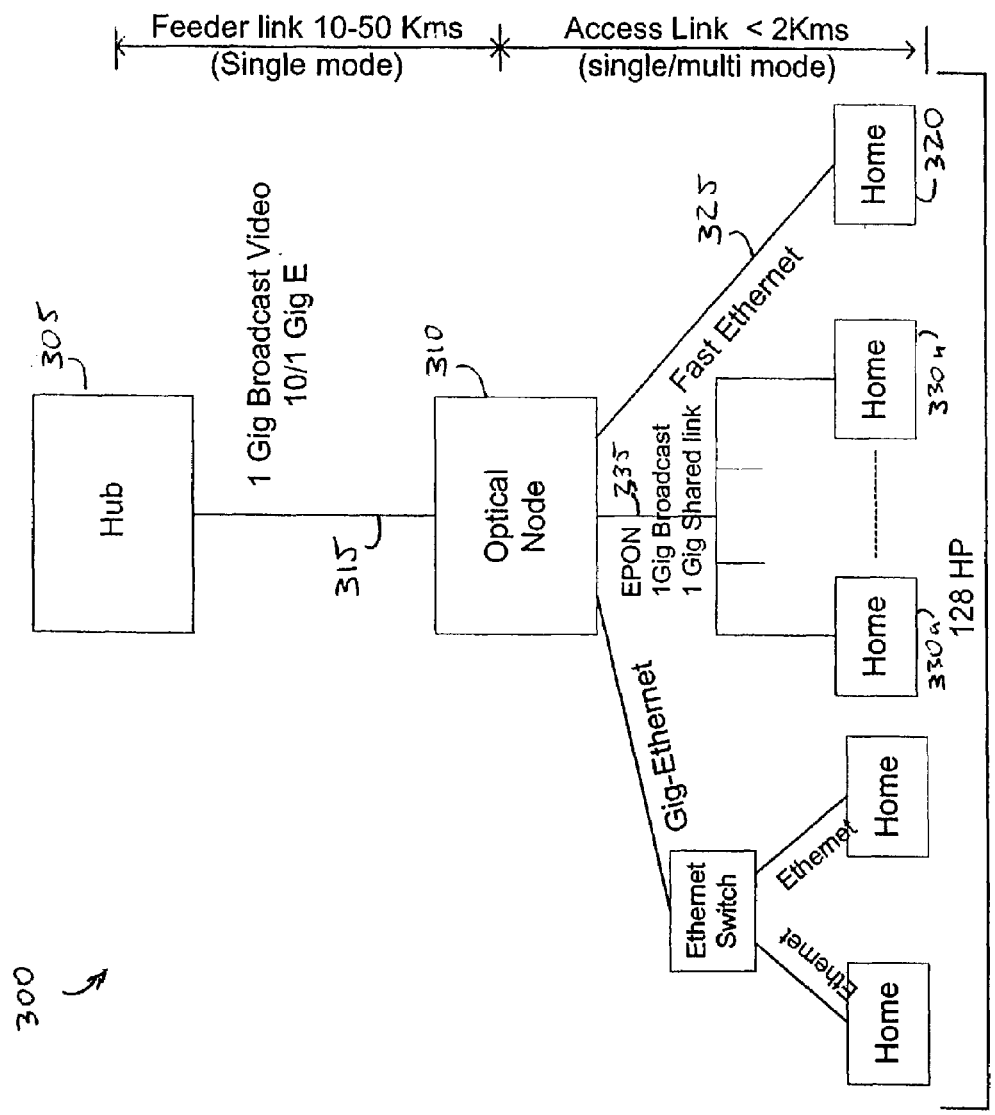
FIG. 3 is a block diagram illustrating the use of an optical node to accommodate a variety of communications topologies.

Moreover, in an embodiment of the invention, an optical node can accommodate multiple topologies on the user side. This is illustrated in FIG. 3. A hub 305 sends high bandwidth data, such as digital video, to an ON 310 via a feeder link 315. An end user in a home 320 can receive the data from ON 310 via a fast ethernet point-to-point (P2P) connection 325. Other homes, such as homes 330*a* through 330*n*, receive data from ON 310 though a shared connection 335.

Figure 4:
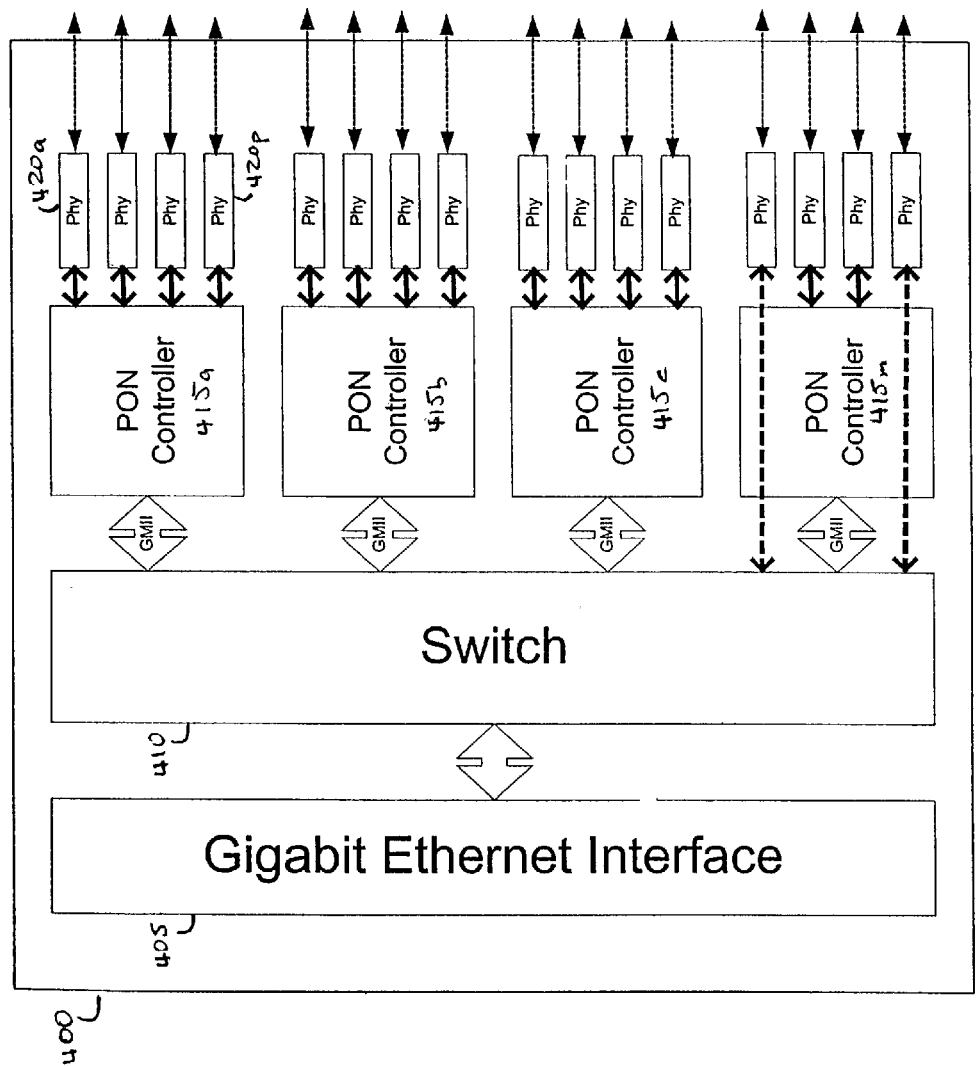
FIG. 4 is a block diagram illustrating an optical node.

An embodiment of an ON is shown in FIG. 4. ON 400 includes a gigabit ethernet interface 405 through which ON 400 connects with a hub. Interface 405 is connected to a switch 410. Switch 410 serves to aggregate traffic headed upstream towards a hub, and can be implemented as a multiplexer/demultiplexer. Switch 410 is connected to one or more PON controllers 415*a* through 415*m*, which arbitrate access and provide link control with respect to end users. Switch 410 and PON controllers 415 provide quality of service functions as well, such as the control of data flow based on prioritization or based on other categorizations of traffic. Each PON controller is connected to one or more PHY devices 420*a* through 420*p*. Each PHY device is then connected through a physical communications medium to an end user device (not shown).

Moreover, in an embodiment of the invention, ON 400 has other interfaces (not shown), to support different kinds of traffic, such as voice, and/or to support circuit emulation.

B. Operational efficiency

1. Cancellation of Laser Humming

In any optical access system, the light sources (e.g., lasers) may not operate continually. Rather, they can cycle as necessary between a powered operational state and an idle state. In the latter, a laser is not completely powered down. The laser emits light at a low level during idle, and is said to "hum." Humming adds noise, affecting the signal-to-noise ratio (SNR) of other signals in the system.

This noise can be ameliorated by using an adaptive equalizer. As is known in the art, an adaptive equalizer can be used to cancel noise on a communications channel. Such an equalizer can cancel the humming of a laser during idle, thereby improving the SNR of information-bearing signals.

Figure 5:
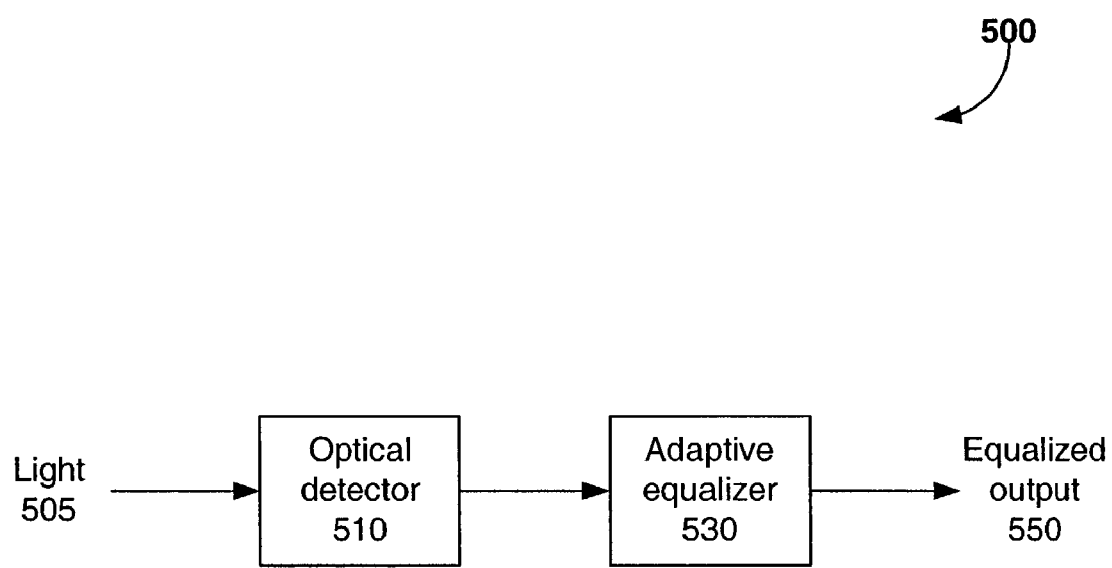
FIG. 5 illustrates the use of an adaptive equalizer to reduce noise in a light source.

In an embodiment of the invention, an adaptive equalizer is used as illustrated in FIG. 5. A receiver 500 receives light 505 from a light source, such as a laser. Light 505 is received at an optical detector 510. The output of optical detector is fed to adaptive equalizer 530. Equalizer output 530 produces an equalized output 550.

2. Spectral Slicing

Figure 12:
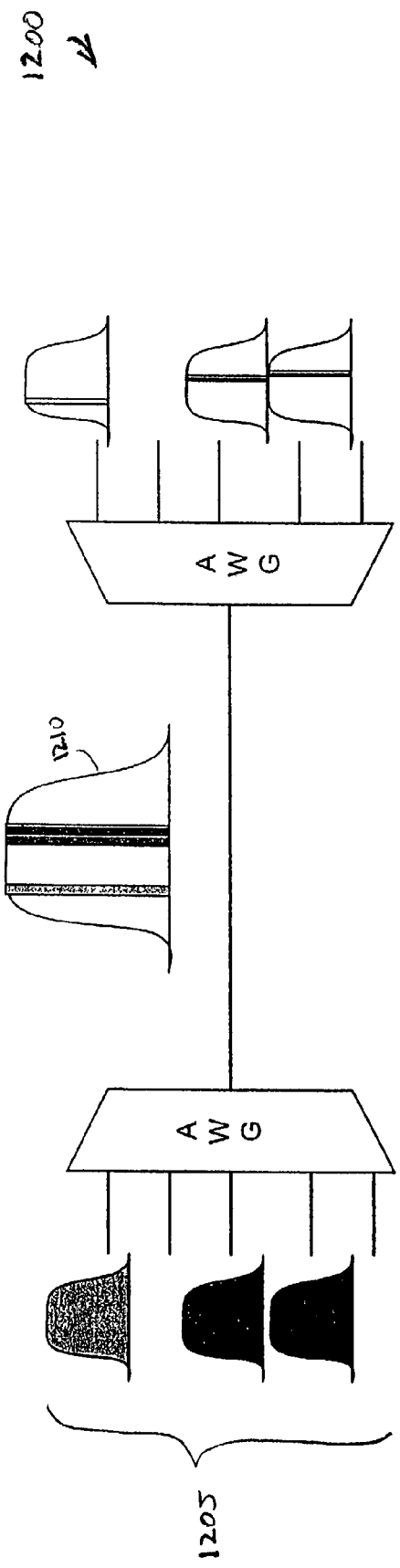
FIG. 12 illustrates the concept of spectral slicing.

Spectral slicing is a technique by which multiple users can use different frequency bands of the same broadband laser source for communication. This is illustrated generally in FIG. 12. Users transmit using different frequencies 1205. These frequencies represent slices of a broadband transmission 1210. This technique enables the implementation of point-to-point links in a point-to-multipoint topology. Since each subscriber uses a different frequency band, subscribers do not interfere with each other.

In such a system there is a tradeoff between the number of subscribers, the bandwidth of the filters required, and the transmit power from each subscriber. There is also a cost tradeoff based on the Q of the filters required. A technique is used in which each subscriber unit has multiple light emitting diodes (LEDs). In an embodiment of the invention, four LEDs are used by subscribers, red, blue, green and yellow. A subscriber can use any one of them for communication with the hub/ON. Since LEDs are very cheap, they will not add significant cost to the subscriber unit. Each unit uses lower Q filtering (representing lower cost) and, as a result, gets to use higher transmit power. The receiver in the ON can split the four different wavelengths using devices like Briggs grating and can demultiplex different subscribers in each wavelength using filters. This enhances the efficiency of bandwidth usage and increases the number of subscribers per port at hub/ON. In addition, this reduces the cost of the overall system.

The split ratio of the PONs can be increased by using signal processing techniques. By using forward error correction (FEC), coding gains on the order of 3–6 dB can be achieved. This can easily double or quadruple the number of subscribers on a single PON. A further improvement of 3 dB can be achieved using adaptive equalization, which can double the subscribers. Since these signal processing techniques can be adding at very little additional cost, the overall cost of the system per subscriber drops significantly.

3. Allocation of Functionality Between Hub and Optical Node

An ON, like any other communications component, has limits as to the functionality that it can incorporate. Factors such as chip size and power dissipation must be considered during system design. DOCSIS, however, requires certain functionality at a headend. This includes timing and sequencing functions, such as ranging. DOCSIS also requires bandwidth allocation processing, such as the generation of map messages. It also requires subscriber service functions, such as authentication and billing.

Because all this functionality can be difficult to put in a single component, a better approach is the dispersal of the functionality. In the context of an optical network such as that of FIG. 3, some functionality, such as the subscriber service functions, can be placed in the hub 305. Other functions, such as timing and bandwidth allocation functions, can be placed in the ON 310. This reduces the processing burden on any single component, with no loss in overall system capability.

C. Bandwidth Management

1. Timebase Synchronization

TDMA systems require the maintenance of a time base which is used to determine time slot boundaries, communicate the time base to all the equipment in the system, and chronologically lock equipment to the time base. The current state of the art is exemplified by the DOCSIS specification. In such systems, the headend generates a time base in the form of a time stamp counter driven by a very precise reference oscillator. The headend communicates the time base to one or more remote devices (e.g., cable modems) via periodic synchronization messages. These messages contain the current time stamp counter value. There are several problems with such a system. Among them, time stamps must be sent relatively often, and the time, as maintained at a remote, can drift slowly so that it can move several counts away from the headend's count. Recovering from such a variation can take a long period of time.

Figure 6:
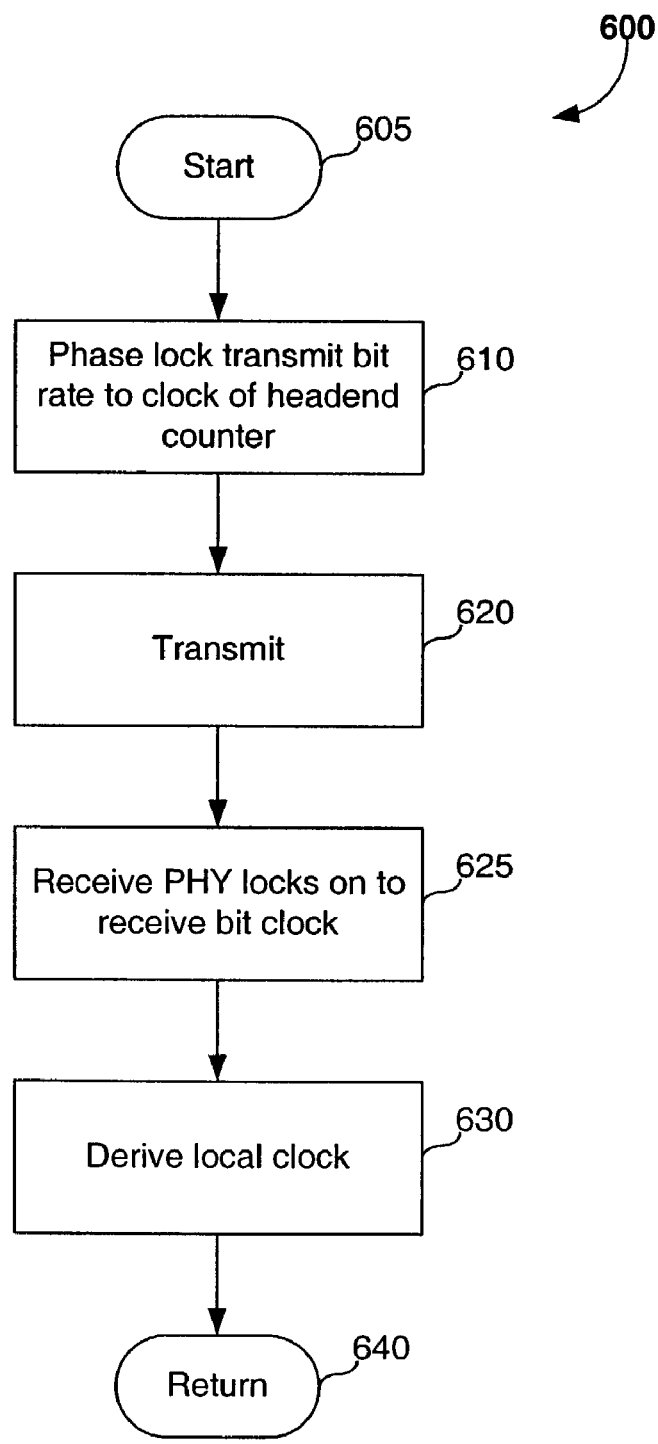
FIG. 6 is a flowchart is a flowchart illustrating the process of timebase synchronization where a remote maintains synchronization by locking on to a phase-locked transmit bit stream.

One method of maintaining synchronization in a TDMA system is the use of synchronous rate locking to keep the rates of the time stamp counts at the headend and each remote device locked to each other. One embodiment uses ethernet PHY devices at both ends. The transmitting PHY at the headend can be viewed as the master. This method is illustrated in FIG. 6. The method starts at step 605. In step 610, the transmitting PHY's transmit bit rate (i.e., the symbol rate for optical PHY) is phase locked to the clock used to generate the headend time stamp counter. In step 620, transmission begins. In step 625, the receiving PHY device at the remote locks on to the bit rate of the incoming data stream. From this the remote's clock is derived locally, which drives the remote's local copy of the time stamp counter (step 630). The method concludes at step 640. Using this method, synchronization messages need not be sent often since they are only used to initialize the counter of a remote when it joins the network and to periodically check the counter against the current value. To initialize, the remote simply loads the first time stamp it receives into its local register. Techniques such as block coding or scrambling can be used to control clock jitter. Block coding has the advantage of maintaining DC balance and can also maintain the required number of bit transitions. Scrambling techniques can have much less overhead.

Other techniques by which time base synchronization can be maintained in a TDMA optical system include an increased frequency of synchronization messages to deal with jitter. This imposes a requirement of the time base generator at the headend to be accurate within 100 picoseconds. This also requires the remote to have tight control on its jitter.

Figure 7:
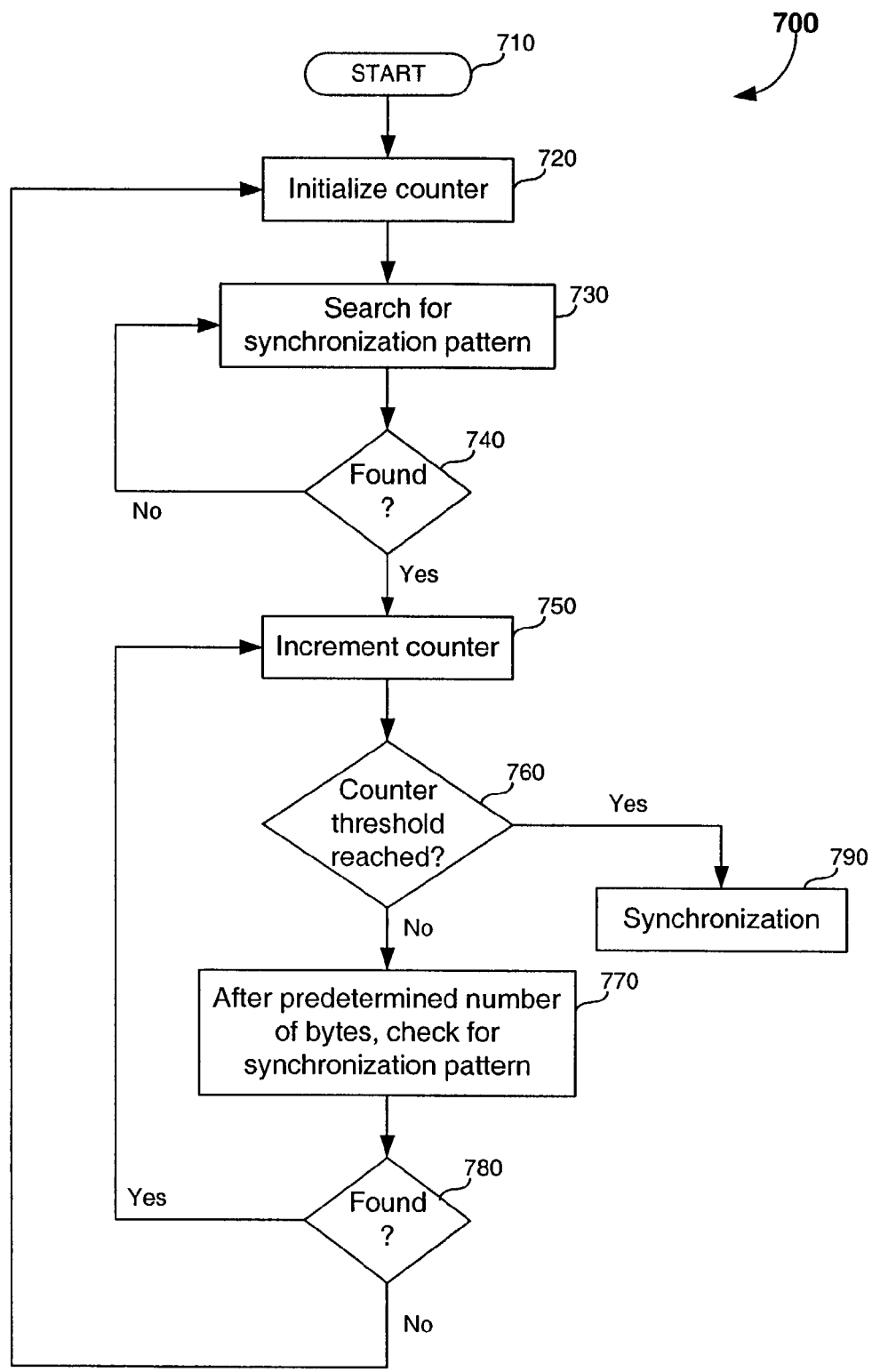
FIG. 7 is a flowchart illustrating the use of a synchronization byte in a Moving Pictures Expert Group (MPEG) frame to synchronize a remote device.

Another option is to use physical layer in-band synchronization using MPEG framing. An MPEG frame has a synchronization byte at the start of the frame. This byte has a specific predetermined synchronization pattern. A remote latches to the periodic synchronization byte to synchronize to the downstream rate. This process is illustrated in FIG. 7, according to an embodiment of the invention. The process begins with step 710. In step 720, a counter is initialized. This counter is used to count the number of times, in succession, that the synchronization pattern is successfully found. In step 730, the remote device searches for the synchronization pattern in incoming traffic. If the pattern is not found, as determined in step 740, searching continues at step 730. If the pattern is found, processing continues at step 750, where the counter is incremented. In step 760, a determination is made as to whether the counter has reached a threshold value. If not, processing continues at step 770. Here, the synchronization pattern is sought at a subsequent point in the traffic, a predetermined number of bytes later. For fixed-length MPEG frames, the pattern is sought 188 bytes later. If, in step 780, the synchronization pattern is found, the counter is incremented in step 750, and the process repeats from this point. If no synchronization pattern is found in step 780, the counter is re-initialized in step 720, and the entire process restarts. If, in step 760, the threshold is reached, this indicates that a sufficient number of synchronization patterns have been found in consecutive attempts, and synchronization is attained (step 790).

Figure 8:
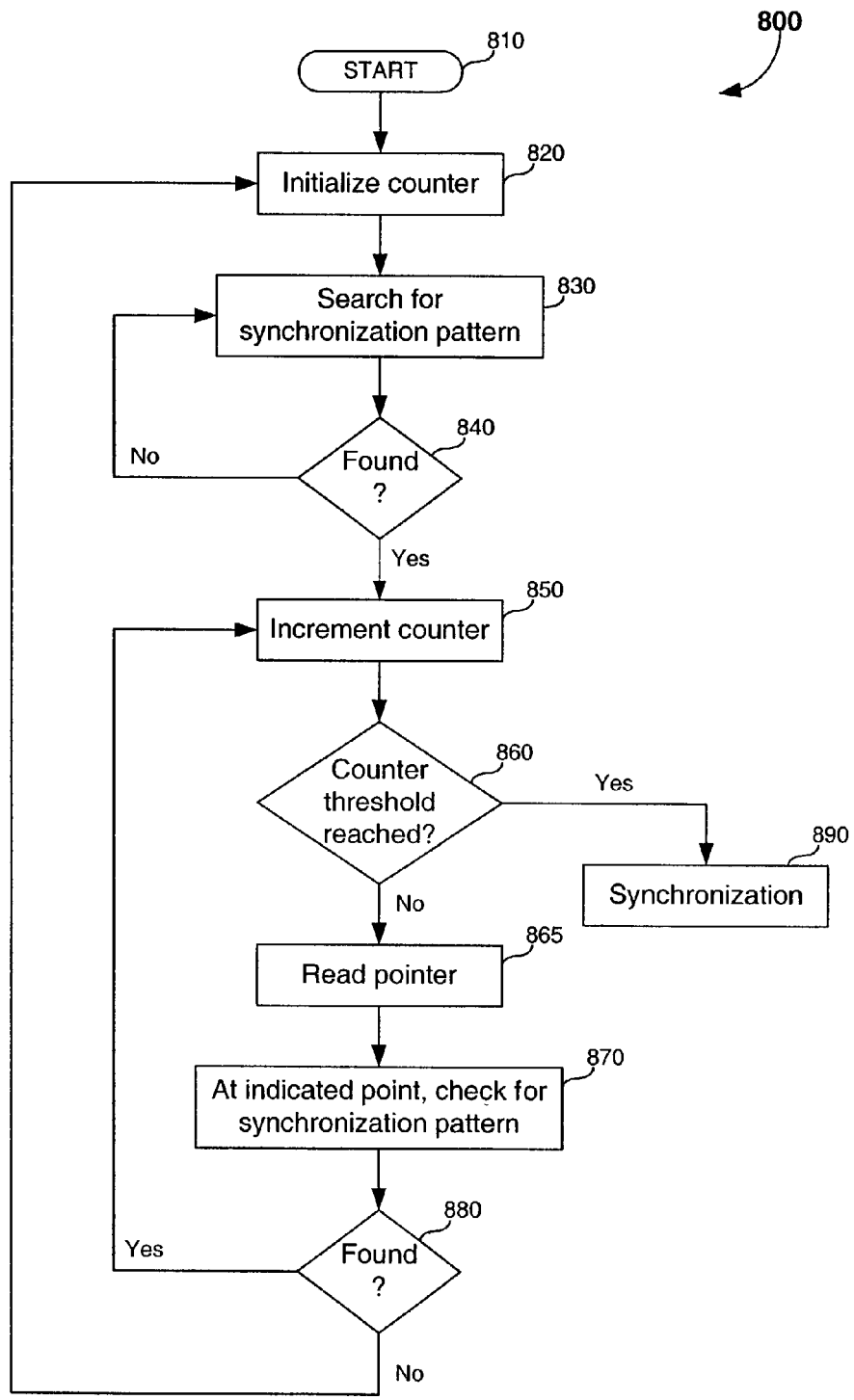
FIG. 8 is a flowchart illustrating the use of a synchronization byte in an variable length packet to synchronize a remote device.

A similar technique can be implemented with variable length packets with the synchronization byte followed by a pointer to the next synchronization byte. This is illustrated in FIG. 8. The process begins with step 810. In step 820, a counter is initialized. Again, this counter is used to count the number of times, in succession, that the synchronization pattern is successfully found. In step 830, the remote device searches for the synchronization pattern in incoming traffic. If the pattern is not found, as determined in step 840, searching continues at step 830. If the pattern is found, processing continues at step 850, where the counter is incremented. In step 860, a determination is made as to whether the counter has reached a threshold value. If not, processing continues at step 865. Here, a pointer is read, where the pointer is found after the last synchronization pattern. The pointer indicates the location, in the incoming traffic, of the next synchronization pattern. In step 870, the next synchronization pattern is sought at the indicated point in the traffic. If, in step 880, the synchronization pattern is found, the counter is incremented in step 850, and the process repeats from this point. If no synchronization pattern is found in step 880, the counter is re-initialized in step 820, and the entire process restarts. If, in step 860, the threshold is reached, this indicates that a sufficient number of synchronization patterns have been found in consecutive attempts, and synchronization is attained (step 890).

2. Wavelength Allocation, Video and Data

In the communications systems described herein, bandwidth limitations can be problematic. Given one gigabit per second of downstream bandwidth, for example, 600 megabits could be required for digital video, leaving only 400 megabits for other data traffic. Typically, video and data signals share the bandwidth through a multiplexing arrangement.

Figure 11:
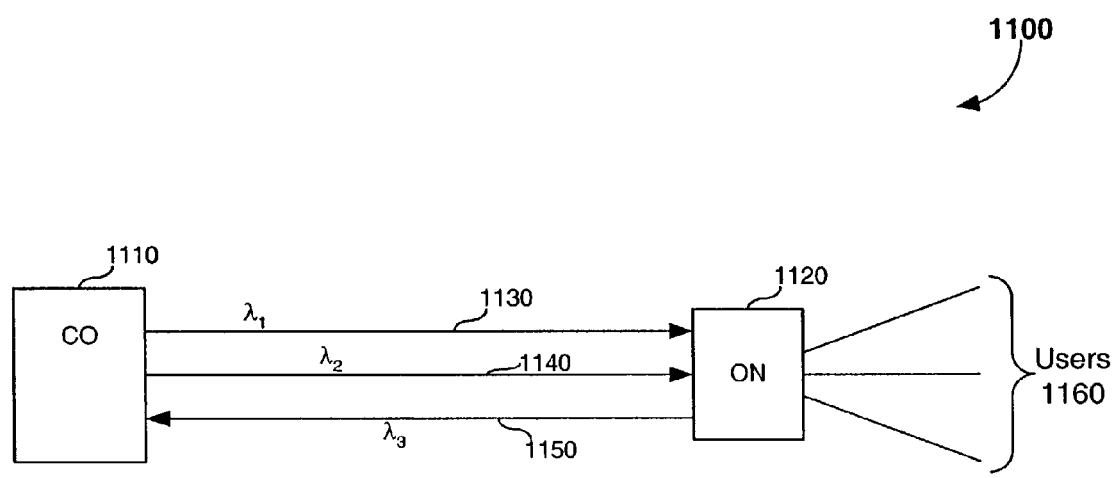
FIG. 11 illustrates the use of different wavelengths to carry downstream video data, downstream non-video data, and upstream data.

An alternative is to allocate different wavelengths to different requirements. For example, one wavelength could be allocated to downstream digital video, while another wavelength would be allocated to downstream non-video data. A third could be allocated to upstream data. This increases the available bandwidth for each requirement, and represents a way to upgrade a traditional PON architecture in light of the need for greater capacity. This is illustrated in FIG. 11. Here, a central office 1110 is in communication with optical node 1120. Downstream digital video is carried on channel 1130, operating at a wavelength $\lambda_1$. Downstream data (non-video) is carried on channel 1140, operating on a wavelength $\lambda_2$. Channel 1150 is used for upstream communications on a wavelength $\lambda_3$. Such an arrangement serves to increase bandwidth between central office 1110 and a set of users 1160.

Note that a video transmission from central office 1110 can be a broadcast, so that multiple optical nodes may receive the $\lambda_1$ transmission. Allocation of wavelengths for downstream non-video transmissions (in FIG. 11, wavelength $\lambda_2$) and upstream transmissions (wavelength $\lambda_3$), however, is done per optical node.

3. Hybrid PON: Broadcast Downstream, Point-to-Point Upstream

Figure 13:
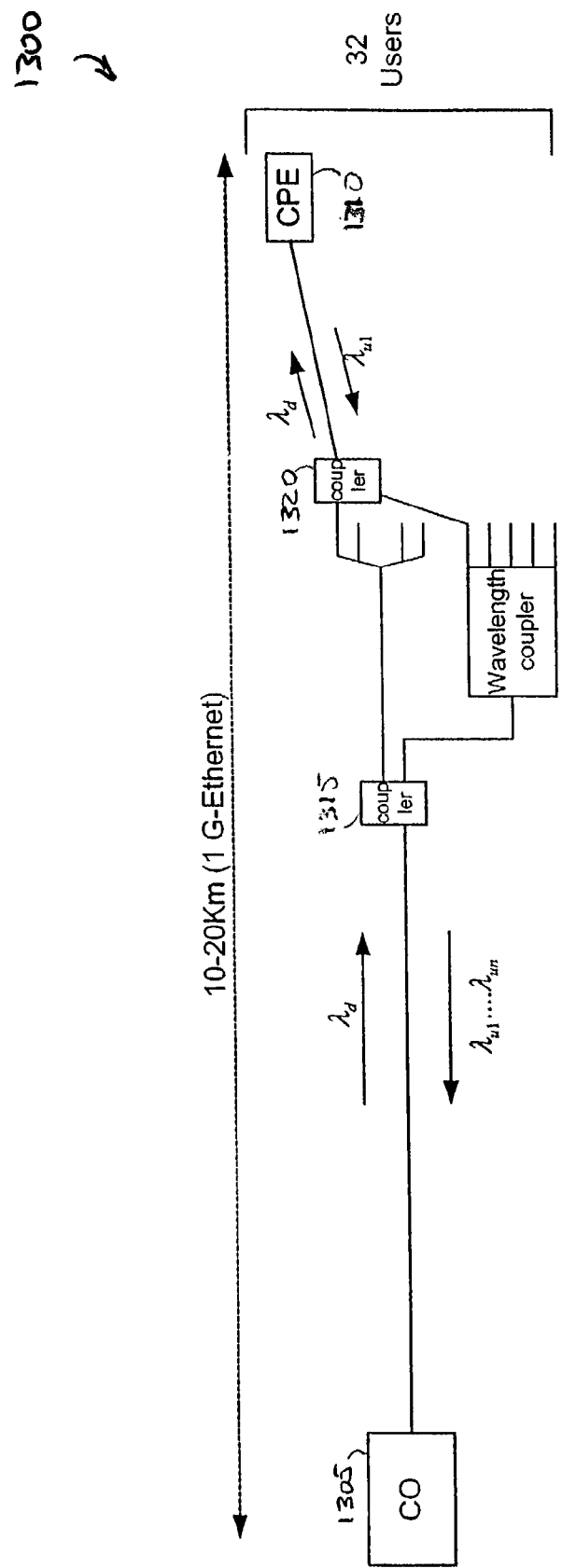
FIG. 13 illustrates hybridization of point-to-point and broadcast architectures.

Another architectural solution to the bandwidth constraint issue is to hybridize broadcast and point-to-point concepts. This is illustrated in FIG. 13. A central office (CO) 1305 broadcasts downstream to all end users, including a remote device 1310, shown here as customer premises equipment (CPE). The broadcast takes place using a single wavelength, $\lambda_d$, and passes through a series of couplers, including couplers 1315 and 1320.

Upstream transmissions take place over multiple wavelengths, one per user, shown here as $\lambda_{u1}$ through $\lambda_{un}$. Hence the upstream is a point-to-point architecture using wavelength division multiplexing (WDM).

Here, the need for a high-powered laser is limited to the CO 1305, as is the need for wavelength detection functionality. Remote devices, such as CPE 1310, require a high bandwidth receiver (e.g., gigabit), but can operate with a lower bandwidth transmitter (e.g., 10/100 megabit).

Figure 14:
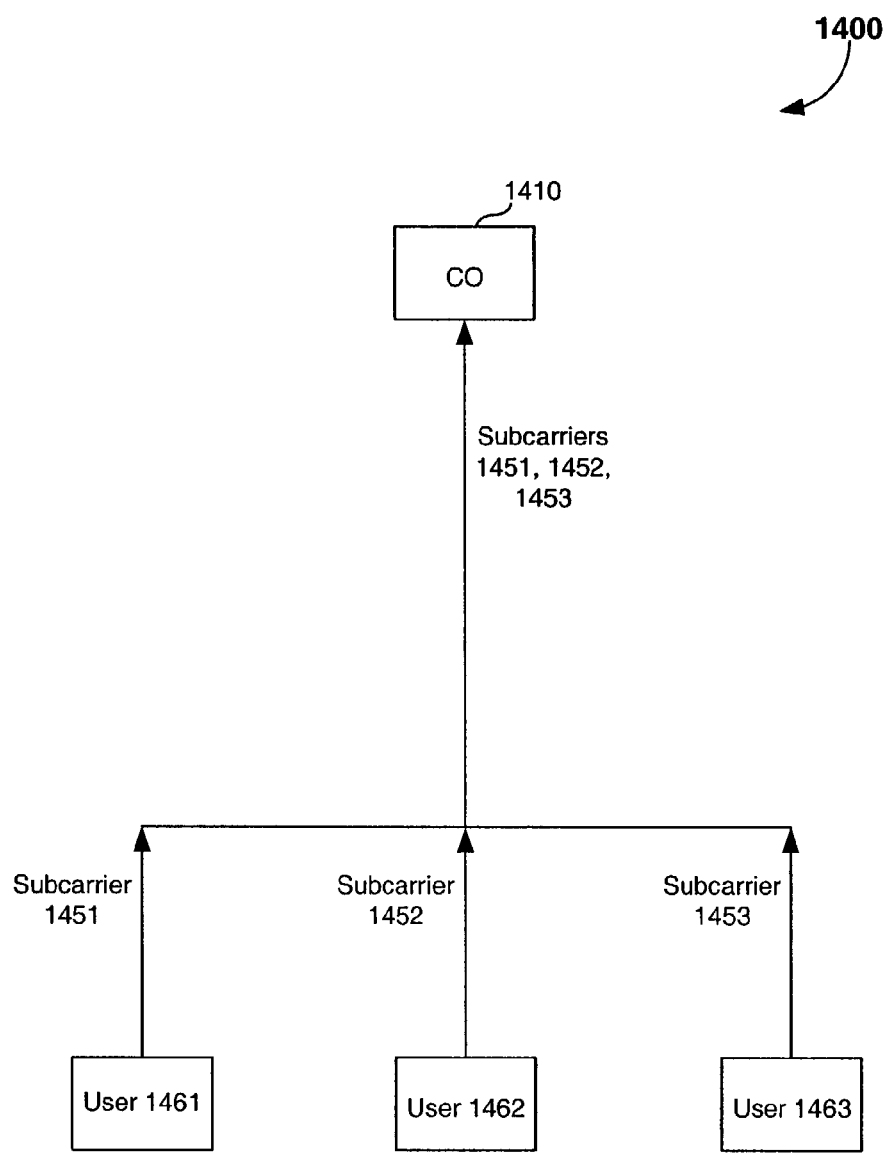
FIG. 14 illustrates subcarrier multiplexing, wherein each user has its own subcarrier.

4. Subcarrier Multiplexing

Where upstream bandwidth is problematic, each user can be assigned his or her own frequency, such that all user frequencies are associated with a single narrowly defined wavelength range. Frequencies can be offset, for example, by 100 MHz in an embodiment of the invention. This allows autonomous communication for each user, without interference. This is illustrated in FIG. 14. Here, a central office 1410 is in communication with users 1461, 1462, and 1463. Each of these three respective users can transmit to central office 1410 using subcarriers 1451, 1452, and 1453, respectively.

5. PON Protocol Architecture: Reservation Ethernet

Figure 9:
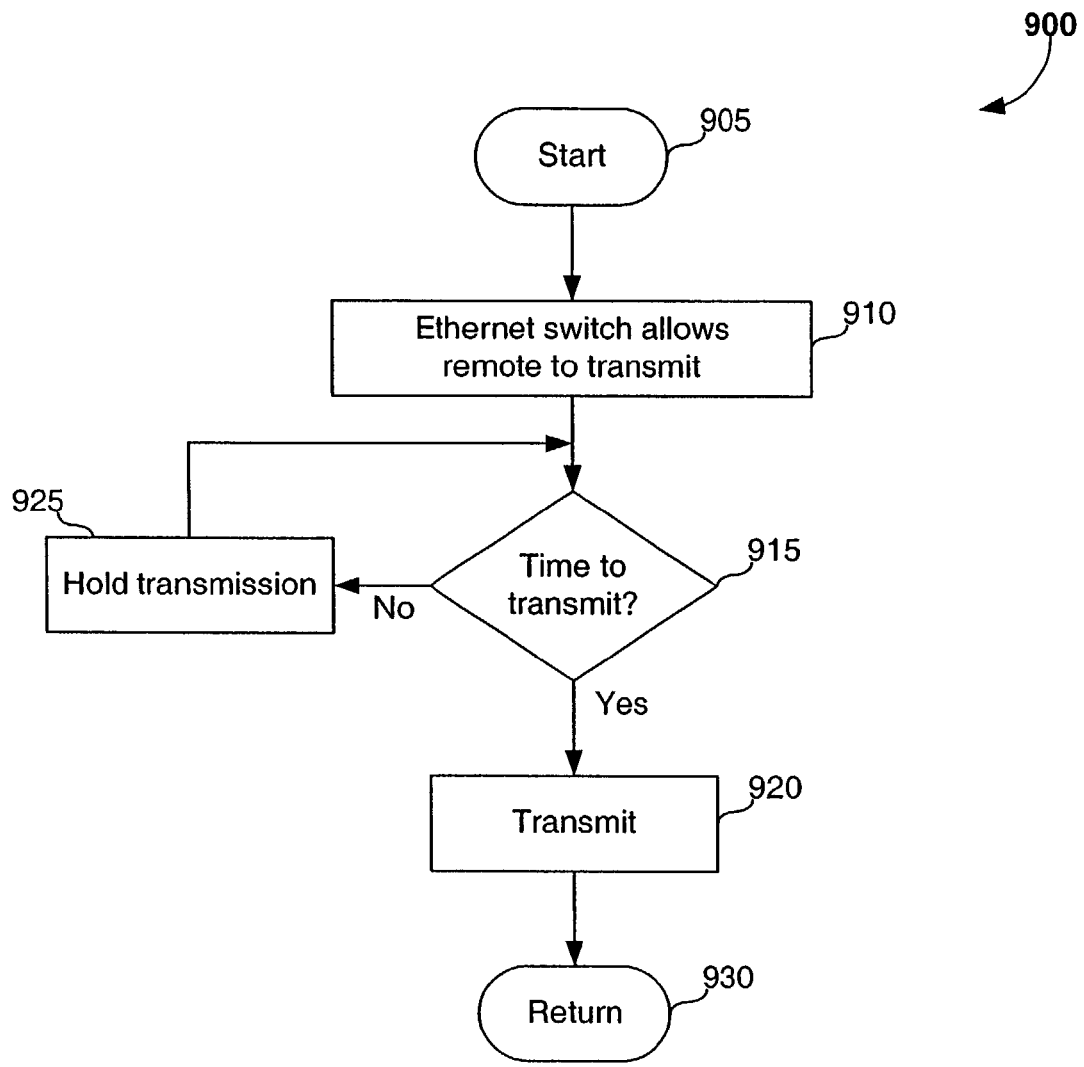
FIG. 9 is a flowchart illustrating the gating of upstream transmissions according to a grant of a headend.

One possibility for a protocol architecture for PON is the use of a reservation ethernet approach. Here, a gating transmission is used, based on a request grant mechanism on top of ethernet. This approach is illustrated in FIG. 9, beginning with step 905. As in a DOCSIS-like protocol, the ethernet switch generates a map message or grant in step 910, to indicate to the remotes when to transmit. A remote receives the grants and determines, in step 915, whether transmission can take place. If not, the remote uses a gating mechanism in step 925 to hold the ethernet transmission since the remote is not allowed to transmit. Otherwise, in step 920, the remote sends the transmission during the granted periods. The process concludes at step 930. Hence this mechanism arbitrates access between remotes, but keeps the underlying ethernet framing transmission. The additional functionality required at the ethernet switch is the gathering and scheduling of requests, creation of acknowledgment responses, creation of map messages, and transmission of the messages downstream. The functionality required at the remote is the reception and interpretation of the map messages, creation of requests, and the gating mechanism to open or block the ethernet transmission. The control messages (such as grants and acknowledgments) generated by the ethernet switch can be specified as new ethernet control messages. To be fully ethernet compliant and avoid fragmentation of frames, minimum grant size can be of a size to fit a payload equal to a minimum ethernet frame size (64 bytes). The message-carrying requests can also be defined to be of a size equal to this minimum frame size. Since request messages are small, this message can be specified to allow the carrying of more than one request at a time.

This gating mechanism based on grant messages from the CO (via, e.g., an OLT) to the ON (e.g., ONU) defines a basic communication between the two. Once the CO recognizes the ON, this mechanism assigns a minimum amount of bandwidth to each ON. Additionally, the ON can request more bandwidth as needed. Hence, this mechanism has a contention approach only when the ON is recognized in the system. After this, the access of recognized ONs is contention free. The amount of bandwidth assigned to a recognized ON can be set at a fixed level when the ON is recognized. This amount can be different for each ON depending on the service agreement given to the ON. In addition, the ability to modify this agreement can be defined in order to allow modification of services more dynamically than just during registration time.

Another option for the PON protocol architecture is the use of reservation aloha (request grant mechanism) as the underlying transmission mechanism. The protocol can be defined as a simple version of DOCSIS with the minimum features in it. For example, fragmentation, payload header suppression, and downstream MPEG transport can be eliminated.

Figure 10A:
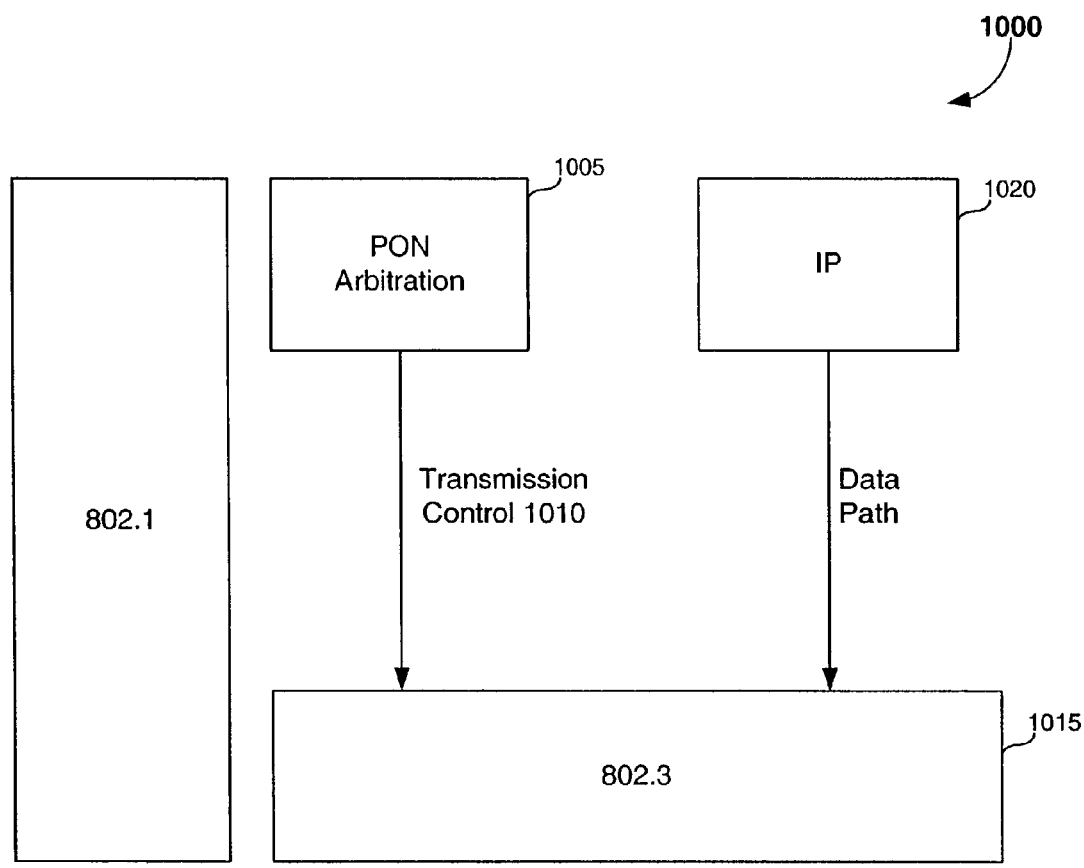
FIGS. 10A and 10B illustrate the relationship between PON arbitration and the 802.3 protocol.
Figure 10B:
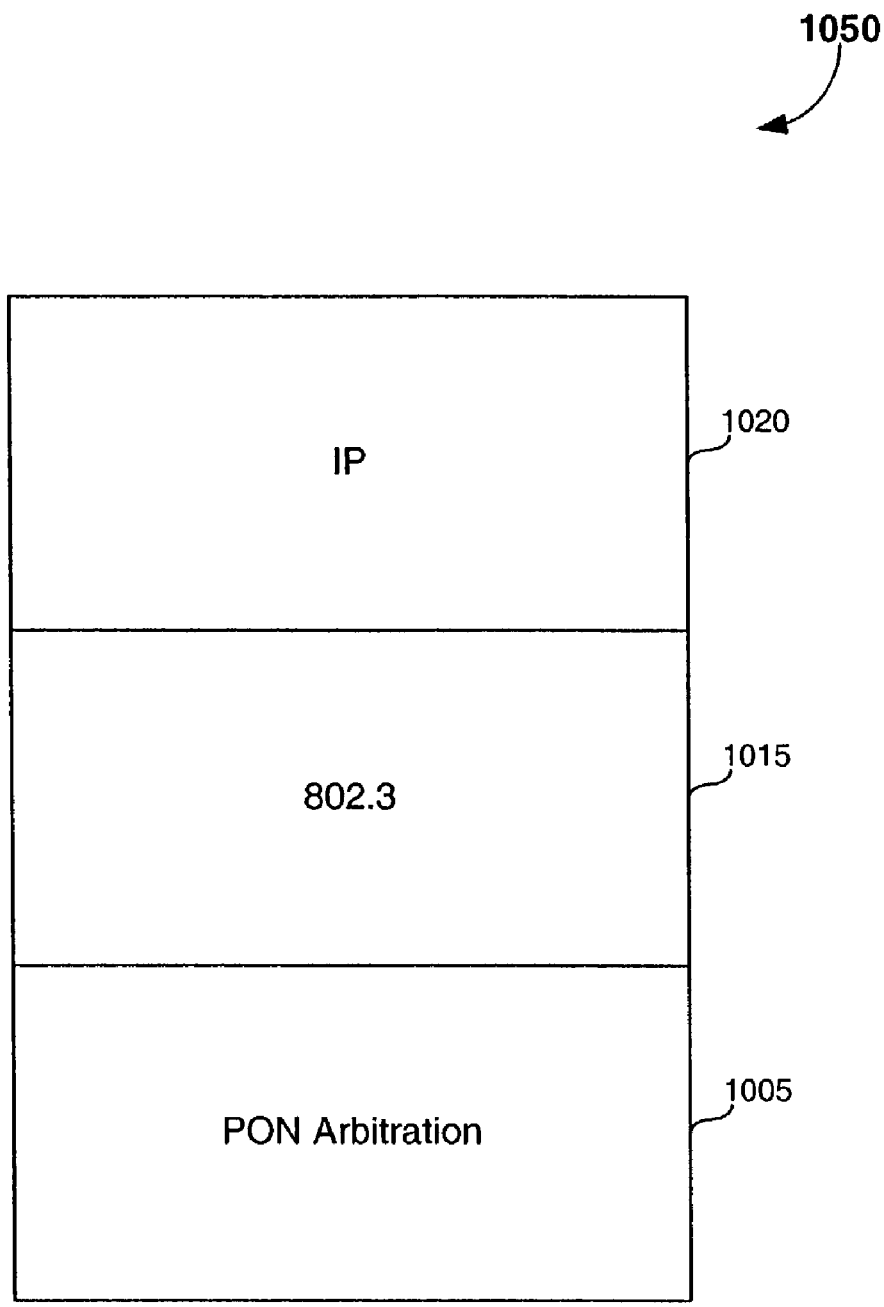

Possible relationships between PON arbitration and the 802.3 protocol are illustrated in FIGS. 10A and 10B. FIG. 10A illustrates the reservation ethernet case, discussed above, according to one embodiment of the invention. Here a PON arbitration process 1005 provides transmission control inputs 1010 to the 802.3 protocol. These inputs can be translated to ethernet frames. And hence, the definition of this protocol just reduces to define the new frame types to carry this additional arbitration information. Alternatively, the 802.3 protocol could be modified to incorporate the PON arbitration in a lower layer of the protocol stack as shown in FIG. 10B. A DOCSIS approach would define the PON arbitration as an additional encapsulation mechanism. Another approach is to consider the PON arbitration as physical layer signaling (such as invalid PCS codes in ethernet).

FIG. 10B illustrates the protocol relationships in the reservation aloha case, discussed above. Here, PON arbitration 1005 is below the 802.3 protocol, which in turn is below IP layer 1020. Therefore, FIG. 10B illustrates an architectural definition of a DOCSIS PON (DPON), wherein an additional header or protocol is provided for PON arbitration. On the other hand, FIG. 10A illustrates an architectural definition for an ethernet-based PON (EPON), wherein the ethernet protocol is extended to provide PON arbitration.

6. Limiting PDU Size and Controlling Fragmentation

Under DOCSIS, when a remote receives a grant, it transmits packets in its queue. In DOCSIS there is a one-to-one mapping between the grant and the request. Hence the transmitted packets correspond to the granted bandwidth except for a small amount of bandwidth due to the minislot-to-grant granularity.

This one-to-one mapping is not available if more smart mechanisms are available in the system. For example, the headend may generate additional unsolicited grants. If a flexible use of grants is implemented, any "flow" can use any grant independently of which flow generated the request. In this case, the granted bandwidth can be filled up with packets until no more packets fit. At the end of the burst it will leave a space that may not fit the next packet to be transmitted.

There are generally two options. First, the space can be left unused. This is inefficient. Second, the next packet could be fragmented. Therefore, a system with no fragmentation may be inefficient if the burst lengths are not large enough. On average there is a waste of half of a packet of average size, per burst. Depending on the burst and average packet sizes, this can be a significant waste.

Figure 15:
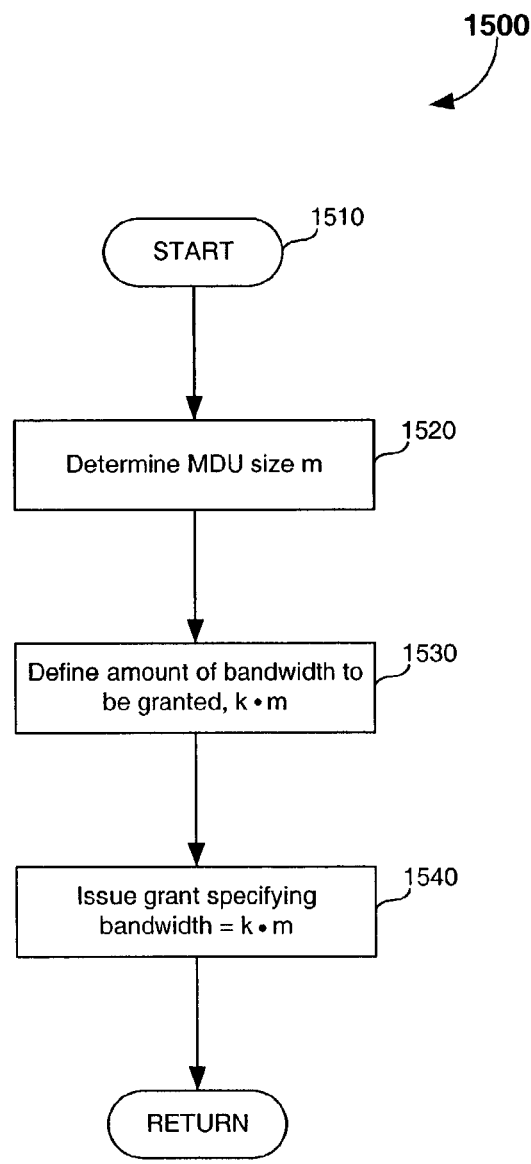
FIG. 15 is a flowchart illustrating the use of a maximum data unit (MDU) in bandwidth allocation.

An alternative to the customary fragmentation approach is to coordinate the packetization at a higher protocol level and specify the sizes of unsolicited grants. In other words a maximum data unit (MDU) can be imposed to break the transmitted data into units that can be better handled in the system. This process is illustrated in FIG. 15. The process begins at step 1510. In step 1520, an MDU is determined to have a size equal to M bytes. In step 1530, the amount of bandwidth to be granted is defined, as an integer multiple of the MDU size. In step 1540, a grant is issued, specifying bandwidth equal to K times the MDU size. The process concludes at step 1550. By carefully choosing the size of unsolicited grants and the MDU size (e.g., defining the size of the grant to be a multiple of the MDU), wasted bandwidth can be minimized. In an embodiment of the invention, different remotes in the system (and even different flows) can operate with different MDU values.

Figure 16:
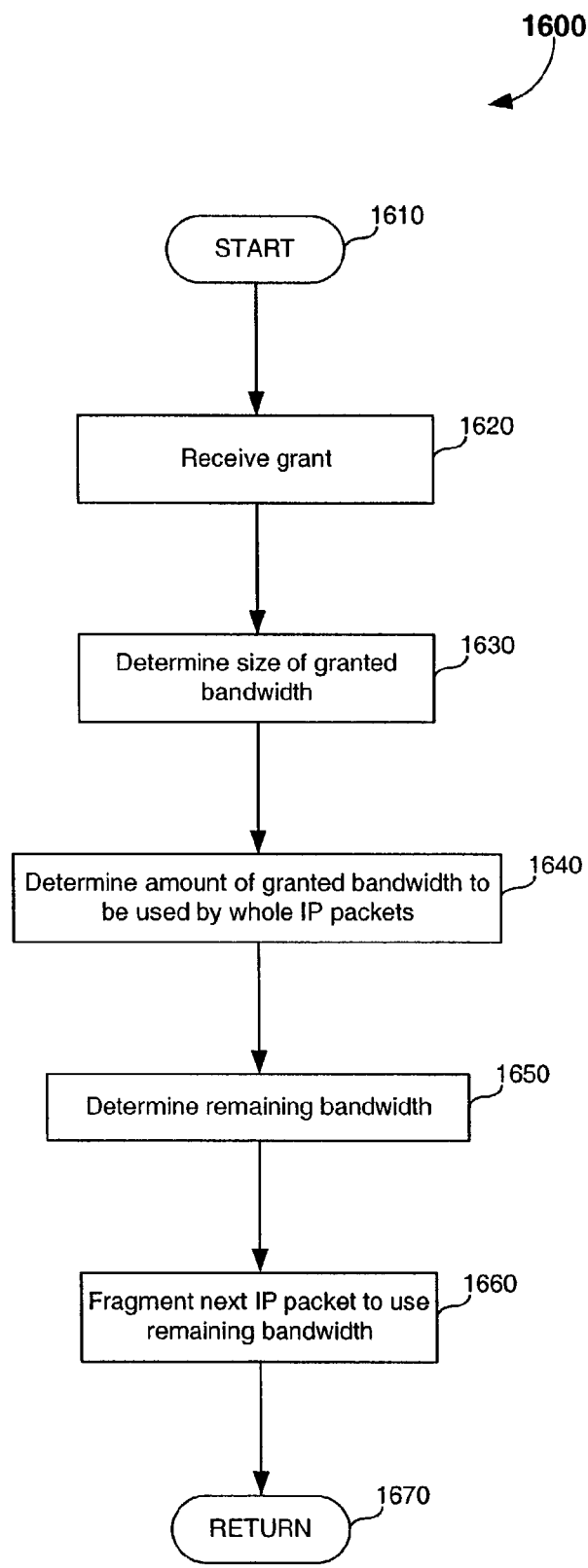
FIG. 16 is a flowchart illustrating flexible packet fragmentation based on available bandwidth.

Another alternative is to perform fragmentation in a more flexible manner, depending on the bandwidth available. Again, what is typically done at the media access layer is now done at the IP layer. In this alternative, an arriving grant is examined to identify its size. An IP packet is then fragmented so as to fit the grant, and the IP header is modified as necessary. This is illustrated in FIG. 16. The process begins at step 1610. In step 1620, a remote device receives a grant of bandwidth. In step 1630, the remote device determines the size of the granted bandwidth. In step 1640, a determination is made as to the amount of granted bandwidth that can be used by whole IP packets. This step determines the number of IP packets that can be contained in the granted bandwidth, and calculates the amount of bandwidth that is consumed thereby. In step 1650, the remaining bandwidth is determined. In step 1660, the next IP packet is fragmented so as to use the remaining bandwidth. The process concludes at step 1670. In an embodiment of the invention, this adaptive process is implemented in hardware, and can be performed in real time.

7. Using Video Bandwidth for Data

As is apparent from the above discussion, the proper allocation of bandwidth is required to service a set of users that have a variety of needs. Ideally, allocation of bandwidth is flexible to allow servicing of different needs as they arise.

Figure 17:
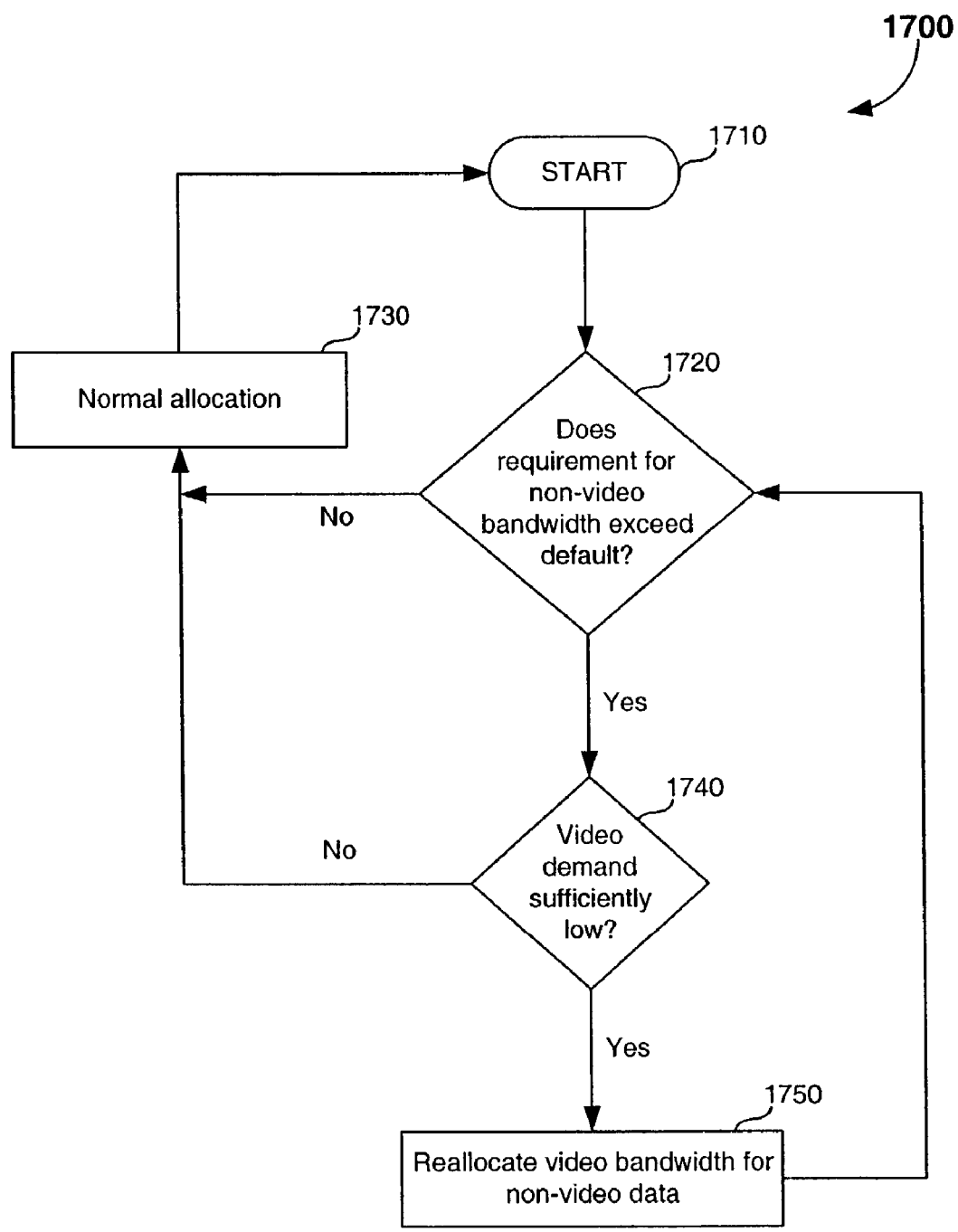
FIG. 17 is a flowchart illustrating reallocation of video bandwidth for non-video data.

Digital video represents a large amount of data transmitted in a continual stream, and therefore requires significant bandwidth. Accordingly, digital transmissions are generally allocated large amounts of bandwidth by default. But, under some circumstances, requirements for non-video data may be great enough to exceed the default allocations for such data. In this case, bandwidth can be taken from transmissions such as video, and reallocated to data channels that require more bandwidth. This requires monitoring of the demand for non-video data. If a predefined demand threshold is exceeded for non-video data, reallocation takes place. If and when such demand returns to a predefined lower level, the system can return to its default bandwidth allocations. In an embodiment of the invention, the reallocation of video bandwidth for other data transmissions can also depend on whether the demand for video is sufficiently low. This process is illustrated in FIG. 17. The process begins with step 1710. In step 1720, a determination is made as to whether the current requirement for non-video bandwidth exceeds a default value. If not, the normal default allocation for non-video bandwidth is used in step 1730. If the requirement for non-video bandwidth exceeds the default value, however, the process continues at step 1740. Here, a determination is made as to whether the demand for video bandwidth is sufficiently low so as to permit reallocation of video bandwidth to non-video data. If the demand for video is not sufficiently low, then the process continues at step 1730, and the normal allocation of non-video data bandwidth is used. If, however, the demand for video is sufficiently low to allow reallocation, then the process continues at step 1750. Here, video bandwidth is reallocated for non-video data. The process then returns to step 1720 for continued monitoring of the requirement for non-video bandwidth.

8. Allocating Bandwidth with Requests and Grants

Figure 18:
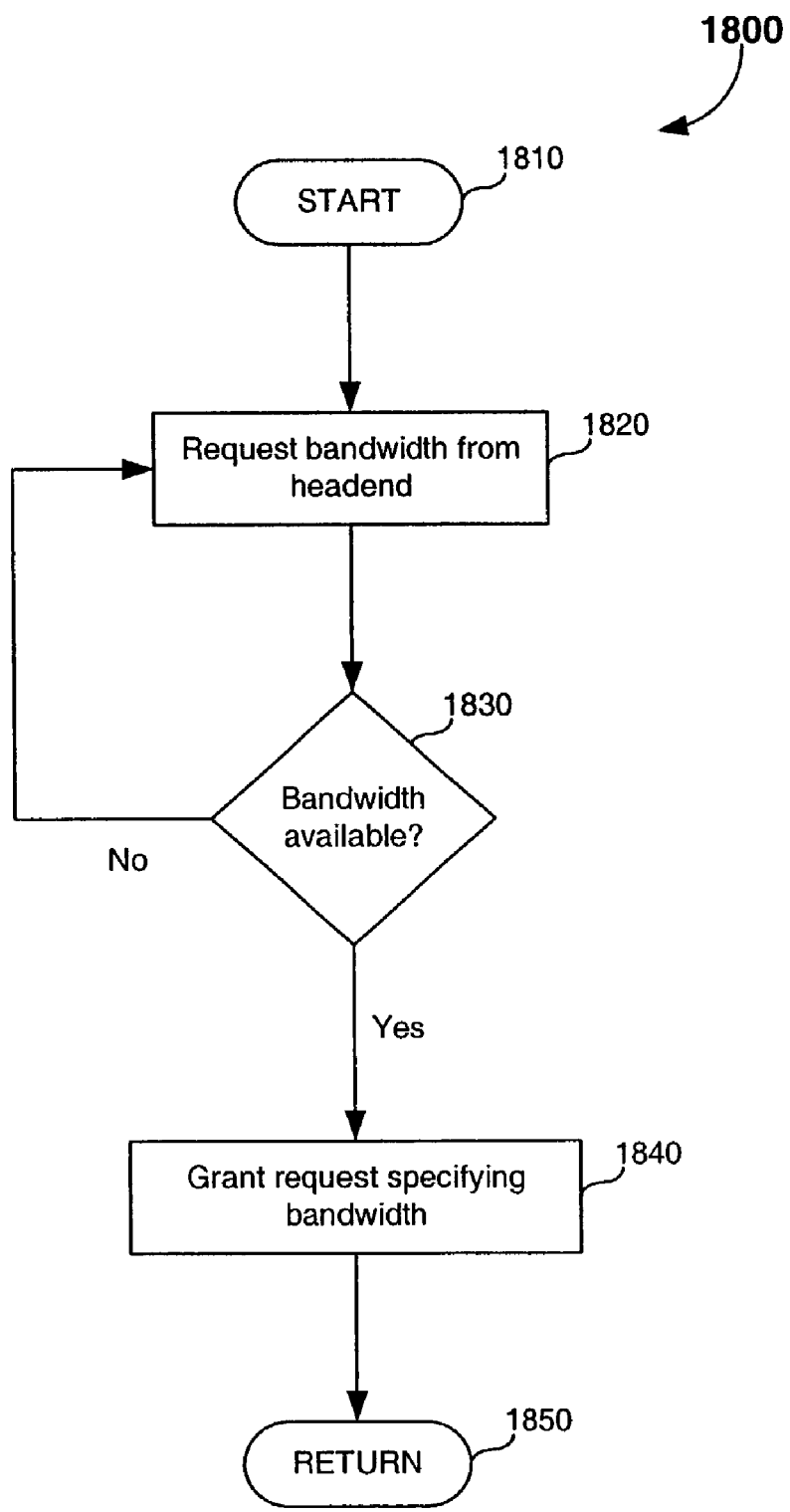
FIG. 18 is a flowchart illustrating the bandwidth request and grant process.

In an embodiment of the invention, bandwidth can be allocated flexibly by using a request/grant mechanism. Such an arrangement is currently defined in the DOCSIS 1.1 standard, but the concept can be adapted to a non-DOCSIS system as well. In such an arrangement, a remote device seeking to transmit does so after requesting bandwidth from a central authority, such as a headend or similar module. If bandwidth is available, a grant is made by the central authority to the remote, specifying the bandwidth to be used by the remote (e.g., a specific time interval). This process is illustrated generally in FIG. 18. The process begins with step 1810. In step 1820, a remote device requests bandwidth from the headend. In step 1830, a determination is made by the headend as to whether bandwidth is available. If not, a subsequent request for bandwidth can be made in step 1820. If bandwidth is available, then the process continues at step 1840, where the request for bandwidth is granted, and the amount of bandwidth is specified in the grant. The process concludes at step 1850.

In an embodiment of the invention, some or all grants can be unsolicited. During registration, bandwidth is allocated according to a fixed assignment policy. As such, the headend can make unsolicited, fixed bandwidth allocations based on state for each remote device. When additional remote devices register, the headend assigns the bandwidth allocation based on availability. In embodiments, the headend dynamically adjusts the bandwidth allocations as the system conditions change, such as remote devices terminating or initiating sessions. The CO keeps the state of the ON bandwidth needs based on the established sessions. In embodiments, the headend dynamically adjusts the bandwidth allocations in response to requests. The adjustment can be in accordance with established dynamic service level agreements with the remote devices.

Contention among remotes for granted bandwidth can be resolved through a priority system or other mechanism. Note that in a TDMA context, the remote and headend must share the same sense of time. This allows a remote's sense of a granted timeslot (starting and ending points) to match that of the headend. Hence a synchronization process may be required prior to any actual request/grant processing.

9. Re-prioritization of Packets to Use Available Bandwidth

In some communications systems, a priority system is in place to resolve contention for available bandwidth. A packet having the highest priority will generally be allowed to use the bandwidth, instead of other lower priority packets that may need to be sent. In some situations, however, this can be an inefficient arrangement. The highest priority packet may be larger than the amount of available bandwidth. The priority logic dictates that only the highest priority packet can be sent, yet this packet cannot be sent because of its size. In this case, the available bandwidth may go wasted.

Figure 19:
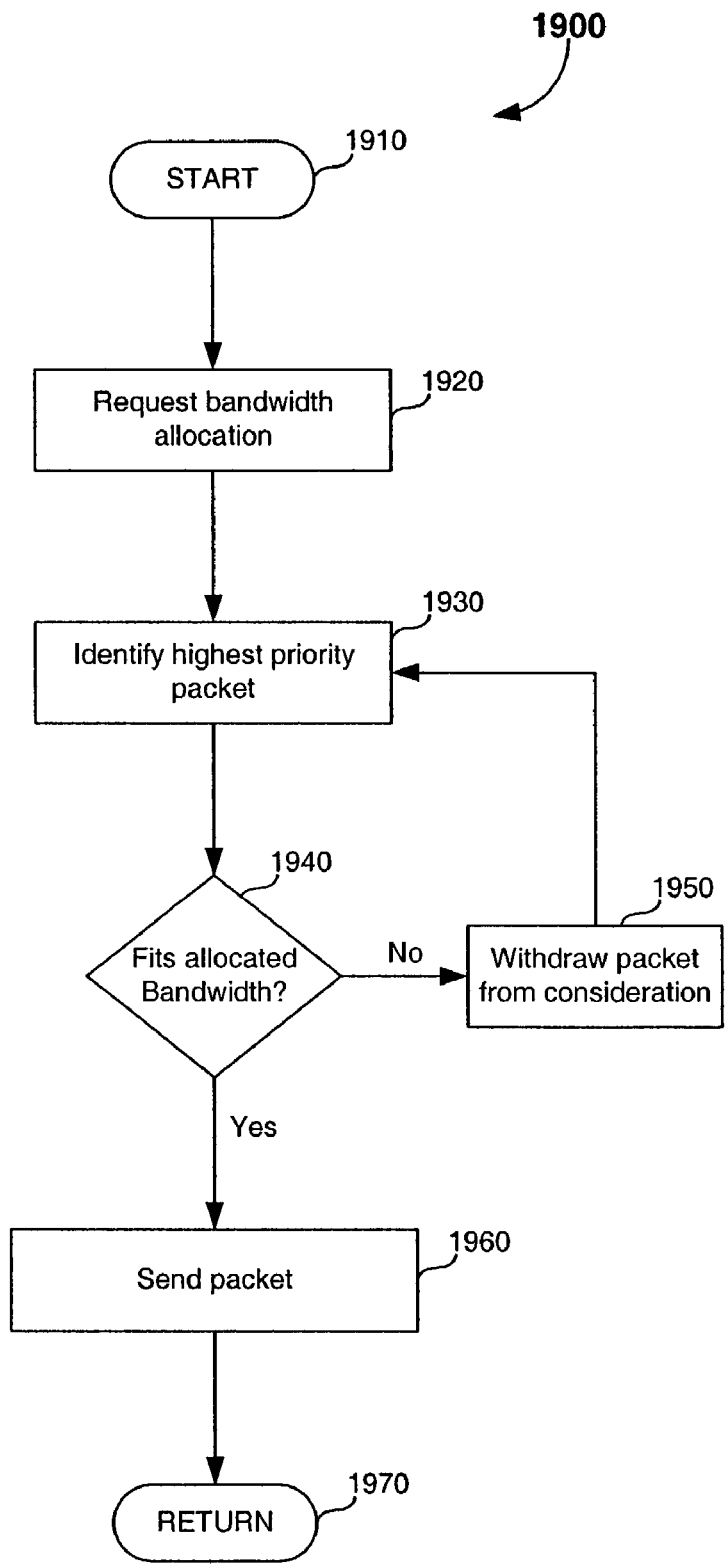
FIG. 19 is a flowchart illustrating packet transmission based on priority and bandwidth availability.

To address this, an exception can be made to the normal priority rules. If a lower priority packet will fit the available bandwidth, this packet will be sent instead of the higher priority packet, rather than wasting the bandwidth. In an embodiment of the invention, the packet to be sent can be identified by choosing the highest priority packet among those that fit the available bandwidth. This is illustrated in FIG. 19. The process begins with step 1910. In step 1920, a remote device receives a bandwidth allocation. In step 1930, the remote device identifies the highest-priority packet among the packets that need to be sent. In step 1940, a determination is made as to whether the highest priority packet fits the allocated bandwidth. If not, then in step 1950, the highest-priority packet is withdrawn from consideration, since it would not fit the allocated bandwidth. The process would then continue at step 1930, where, among the remaining packets, the highest-priority packet is identified. If, in step 1940, the highest-priority packet fits the allocated bandwidth, then the process continues at step 1960. Here, the packet is sent. The process concludes at step 1970. Alternatively, if efficient bandwidth usage is important, the system can choose the largest packet that will fit. Alternatively, some combination of best fit and highest priority can be used to determine the packet to be sent.

III. User Services

A. Video Switching at Optical Node

Users typically desire the ability to readily control what information they access. In the context of downstream digital video, this includes the ability to select a channel for viewing. Current architectures provide for switching at a hub, such as hub 305 of FIG. 3. In response to a user command, hub 305 performs the requested switching and forwards the appropriate transmission to ON 310, and ultimately to the user.

This creates latency in system response to the user's commands, however, given that the command must go all the way to the hub 305, which must then react. Alternatively, the link 315 carries broadcast video of all transmissions to ON 310. Switching is then performed there, instead of at hub 305. While this requires greater bandwidth between hub 305 and ON 310, the latency of the response to user input is reduced. Moreover, this switching function can also be performed at a central office if, for example, the system does not include an optical node.

B. MPEG Buffering at Optical Node

When MPEG-formatted video is transmitted, a sequence of individual frames is organized into a "group of pictures" (GOP). A GOP begins with an I frame, and is followed by B frames (or T frames, depending on the method of coding). Generally, if a user switches to a transmission at a time when a GOP has already started, i.e., after the I frame, the entire GOP associated with that I frame is inaccessible.

Figure 20:
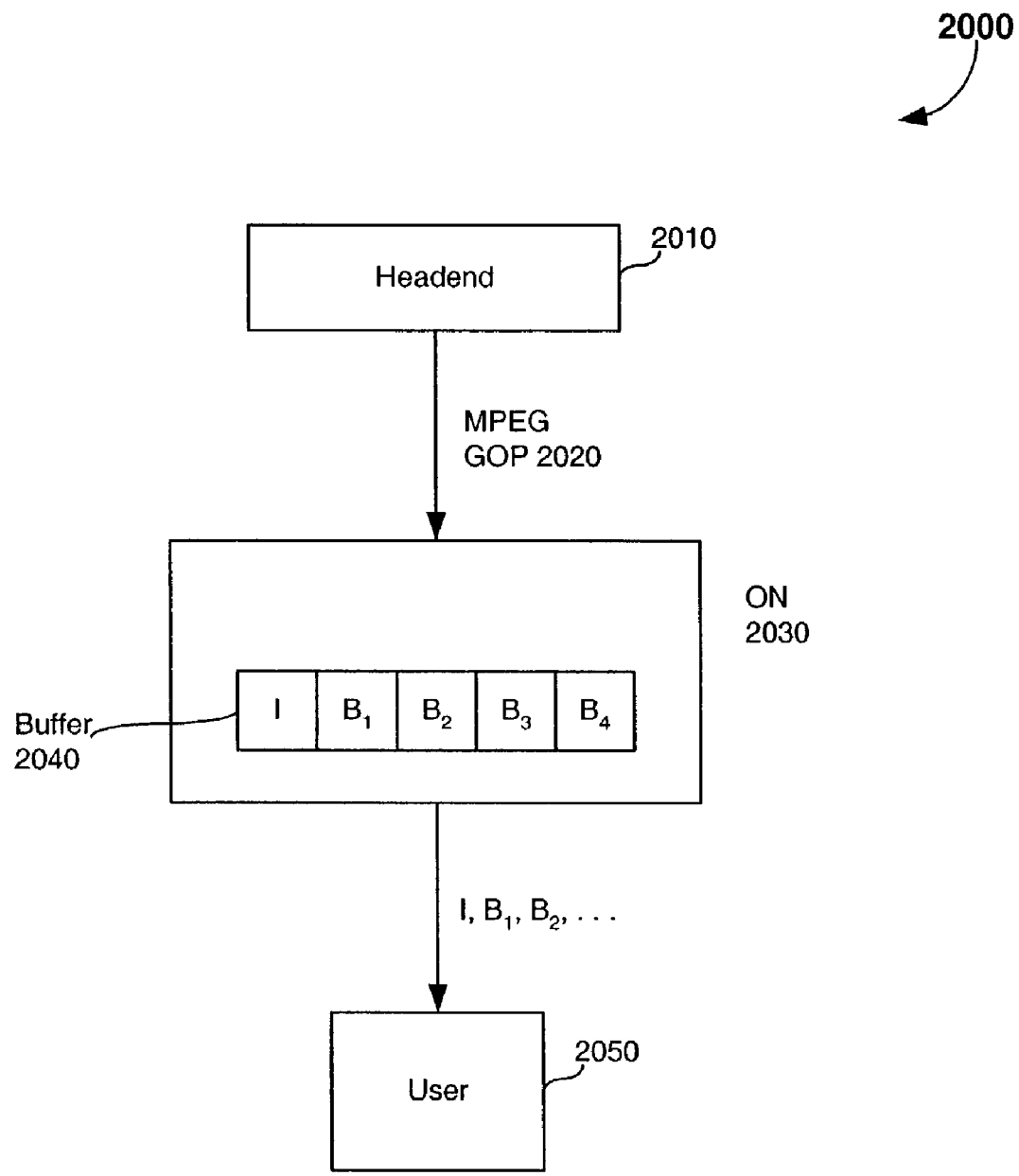
FIG. 20 is a block diagram illustrating the buffering of MPEG frames at an optical node (ON).

This can be remedied if GOPs are buffered. This is illustrated in FIG. 20. Here, headend 2010 transmits a GOP 2020. GOP 2020 is held in buffer 2040, located in optical node 2030. This makes each frame of GOP 2020 available to user 2050. A user switching to a transmission in mid-GOP can then access a full GOP, starting with its I frame. In an embodiment of the invention, the GOP is buffered at the ON in a circular buffer. When a user switches to a video transmission, he or she has access to all of the current GOP, since all the GOP's frames up to this point, starting with the GOP's I frame, are available.

This concept can also be applied in contexts other than optical networks. In general, buffering of video frames at an intermediate node, as described above, can take place in any access network having switched video service. Moreover, buffering can also take place at a central office when, for example, the system topology does not include an ON.

C. Channel Surfing and Proactive Streaming

Given the latency that can occur when a user switches among different video transmissions, the practice of scanning multiple transmissions in sequence (analogous to "channel surfing") becomes difficult. This can be addressed by making the switching functionality more intelligent. If, for example, switching is done at the ON (as described above), the ON can be made to sense when channel surfing is taking place.

Figure 21:
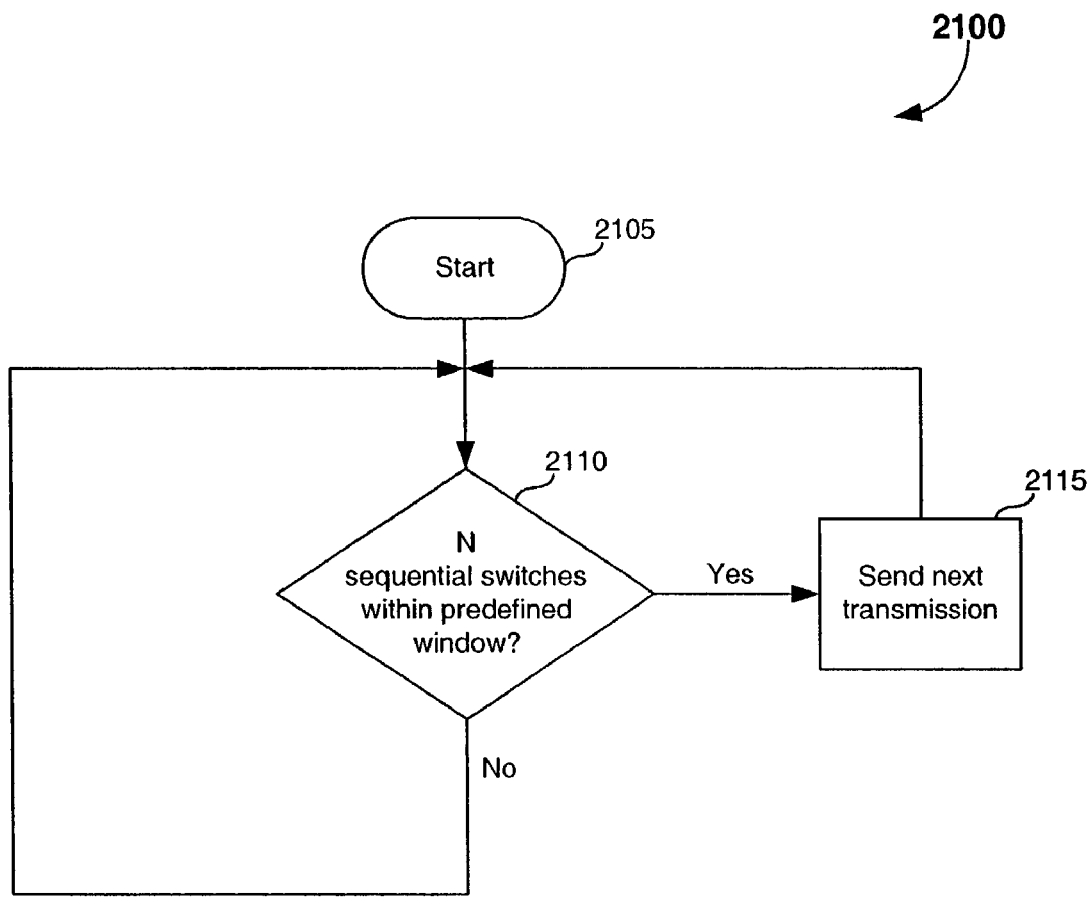
FIG. 21 is a flow chart illustrating proactive video streaming.

This is illustrated in FIG. 21. This process begins at step 2105. In step 2110, a determination is made as to whether a user has requested some number N of sequential switches within a predetermined window of time. If so, it is assumed that the user is surfing and, in step 2115, the ON proactively sends the next transmission to the user prior to receipt of the actual switch request. The determination of step 2110 can then be repeated, and the next transmission can likewise be sent proactively, etc. When, in step 2110, it is determined that surfing has stopped (i.e., fewer than N sequential switches within the time window), the next transmission is not sent, and the determination of step 2110 is repeated. This serves to monitor the user for subsequent channel surfing.

This concept can also be applied in contexts other than optical networks. In general, detection of sequential switches and anticipation of future switching at an intermediate node, as described above, can take place in any access network having switched video service. Moreover, this functionality can also be placed in a central office when, for example, the system does not include an ON.

B. Other DOCSIS Variations

Other variations on DOCSIS 1.1 can be used for the sake of economy and computational simplicity. In particular, DOCSIS can be implemented without one or more of the features specified by the standard. For example, packet fragmentation/reconstruction and payload header suppression can be omitted, since these functions can be computationally intensive. Likewise, the packet classification function can be limited. These omissions can make processing faster and can in some circumstances increase available bandwidth.

IV. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments.

What is claimed is:

1. A fiberoptic access network, comprising:
   a central office;
   at least two end-user devices in optical communication with said central office, each end-user device including a plurality of light emitting diodes (LEDs), each LED in said plurality of LEDs having a different color than other LEDs in said plurality of LEDs; and
   at least one coupler disposed between and in optical communication with said central office and said end-user devices,
   wherein downstream communications from said central office to said end-user devices are transmitted on a first wavelength, and upstream communications from each end-user device to said central office are transmitted on an upstream wavelength selected from said plurality of LEDs in said end-user device, wherein said upstream wavelength from said end-user device is different from upstream wavelengths from other end-user devices and wherein one of the plurality of LEDs can be dynamically selected for upstream transmission, and wherein a laser provides optical energy to carry communications, wherein each end user device comprises an adaptive equalizer that cancels noise generated by said laser.

2. A fiberoptic access network, comprising:

a central office;

at least two end-user devices in optical communication with said central office, each end-user device including a plurality of light emitting diodes (LEDs), each LED in said plurality of LEDs having a different color than other LEDs in said plurality of LEDs; and at least one coupler disposed between and in optical communication with said central office and said end-user devices, wherein downstream communications from said central office to said end-user devices are transmitted on a first wavelength, and upstream communications from each end-user device to said central office are transmitted on an upstream wavelength selected from said plurality of LEDs in said end-user device, wherein said upstream wavelength from said end-user device is different from upstream wavelengths from other end-user devices and wherein one of the plurality of LEDs can be dynamically selected for upstream transmission, and wherein a laser provides optical energy to carry upstream communications, wherein said central office comprises an adaptive equalizer that cancels noise generated by said laser.

3. A fiberoptic, ethernet-based time division multiple access communications system, comprising:

a central office;

at least two end-user devices in optical communication with said central office, each end-user device including a plurality of light emitting diodes (LEDs), each LED in said plurality of LEDs having a different color than other LEDs in said plurality of LEDs;

at least one coupler disposed between and in optical communication with said central office and said end-user devices; and an aggregating optical node disposed between and in communication with said central office and said end-user devices, wherein downstream communications from said optical node to said end-user devices are transmitted on a first wavelength, and upstream communications from each end-user device to said optical node are transmitted on an upstream wavelength selected from said plurality of LEDs in said end-user device, wherein said upstream wavelength from said end-user device is different from upstream wavelengths from other end-user devices and wherein one of the plurality of LEDs can be dynamically selected for upstream transmission, and wherein a laser provides optical energy to carry communications, wherein each end user device comprises an adaptive equalizer that cancels noise generated by said laser.

4. A fiberoptic, ethernet-based time division multiple access communications system, comprising:

a central office;

at least two end-user devices in optical communication with said central office, each end-user device including a plurality of light emitting diodes (LEDs), each LED in said plurality of LEDs having a different color than other LEDs in said plurality of LEDs;

at least one coupler disposed between and in optical communication with said central office and said end-user devices; and an aggregating optical node disposed between and in communication with said central office and said end-user devices, wherein downstream communications from said optical node to said end-user devices are transmitted on a first wavelength, and upstream communications from each end-user device to said optical node are transmitted on an upstream wavelength selected from said plurality of LEDs in said end-user device, wherein said upstream wavelength from said end-user device is different from upstream wavelengths from other end-user devices and wherein one of the plurality of LEDs can be dynamically selected for upstream transmission, and wherein a laser provides optical energy to carry upstream communications, wherein said central office comprises an adaptive equalizer that cancels noise generated by said laser.

* * * * *